(12) United States Patent
Michimori et al.

(10) Patent No.: US 7,883,220 B2
(45) Date of Patent: Feb. 8, 2011

(54) PROJECTION APPARATUS

(75) Inventors: Atsushi Michimori, Tokyo (JP); Junichi Aizawa, Tokyo (JP); Eiji Niikura, Tokyo (JP); Hidekazu Kodera, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 1023 days.

(21) Appl. No.: 11/646,309

(22) Filed: Dec. 28, 2006

(65) Prior Publication Data
US 2007/0183032 A1 Aug. 9, 2007

(30) Foreign Application Priority Data

Feb. 9, 2006 (JP) .............................. 2006-032301
Nov. 14, 2006 (JP) .............................. 2006-307834

(51) Int. Cl.
*G03B 21/22* (2006.01)
(52) U.S. Cl. ...................................... 353/119
(58) Field of Classification Search ................ 353/119, 353/77; 248/917, 346.01, 349.1; 359/443; 77/119, 77
See application file for complete search history.

(56) References Cited

U.S. PATENT DOCUMENTS

| 3,161,069 A | * | 12/1964 | Kirchner | ..................... | 74/110 |
| 5,479,809 A | * | 1/1996 | Stachuletz et al. | ............. | 72/244 |
| 6,059,413 A | * | 5/2000 | Okubo | ........................ | 353/77 |
| 6,702,246 B1 | * | 3/2004 | Schriever | ..................... | 248/656 |

FOREIGN PATENT DOCUMENTS

| EP | 0047918 A2 | 3/1982 |
| EP | 0047918 A3 | 3/1982 |
| JP | 57-80093 A | 5/1982 |
| JP | 7-250298 A | 9/1995 |
| JP | 11-84532 A | 3/1999 |
| JP | 11-249234 A | 9/1999 |
| JP | 2003-167296 A | 6/2003 |
| JP | 2003-177464 A | 6/2003 |
| JP | 2003-337379 A | 11/2003 |
| JP | 2004-20670 A | 1/2004 |
| JP | 2004-287205 A | 10/2004 |
| JP | 2005-99617 A | 4/2005 |

\* cited by examiner

*Primary Examiner*—Georgia Y Epps
*Assistant Examiner*—Jerry Brooks
(74) *Attorney, Agent, or Firm*—Birch, Stewart, Kolasch & Birch, LLP

(57) ABSTRACT

A projection apparatus includes an optical engine (10) that projects an image on a screen from a rear side, an engine supporting plate (100) on which the optical engine (10) is placed, an adjusting member (500) of a substantially wedge-shape inserted into between a base portion (11) and a lower surface of the engine supporting plate (100) so that front or rear end of the engine supporting plate (100) is vertically rotatable, a front-to-rear position adjusting unit (56) capable of moving the adjusting member (500) in front-to-rear direction, a slope portion (108) having a slope surface (109) that gradually increases or decreases an angle of a surface of the adjusting member (500) contacting the engine supporting plate (100) in accordance with a movement of the adjusting member (500), and a fixing unit (551, 552) that fixes the engine supporting plate (100) to an adjusted position.

6 Claims, 23 Drawing Sheets

DISPLACEMENT

ROTATIONAL DISPLACEMENT

VERTICAL KEYSTONE

HORIZONTAL KEYSTONE

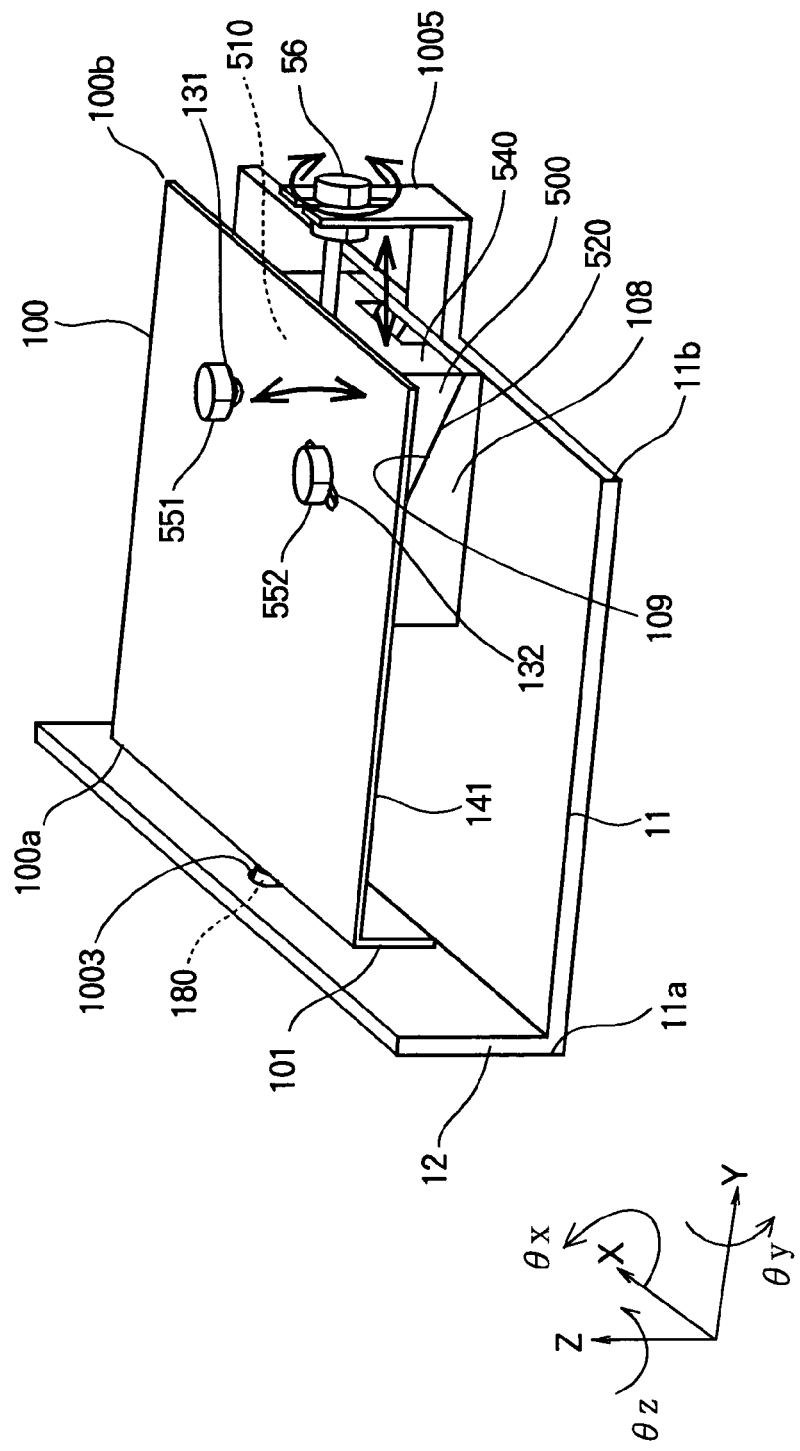

PROJECTION APPARATUS

BACKGROUND OF THE INVENTION

This invention relates to a projection apparatus of rear-projection type (such as a rear projector) having an optical engine that projects an image from a rear side of a transmission-type screen. In particular, this invention relates to a projection apparatus having an adjusting mechanism for adjusting an angle at which the image is projected.

In a projection apparatus generally known as a rear projector, a transmission-type screen is provided on a front surface of a housing, and an optical engine that projects an image from a rear side of the transmission-type screen is placed in the housing. An angle at which the optical engine projects the image is adjusted so that the image is projected in an appropriate direction.

In the manufacturing process of the rear projector, there may be individual differences in the shape of the housing and dimension errors, assembling errors and deformation of respective components mounted in the housing. For these reasons, the contour of the displayed image may be varied, and the angle at which the image is projected on the transmission-type screen may be varied. As a result, the position of the projected image may deviate from the ideal position, or the image may be deformed. Further, in the general manufacturing process of the conventional rear projector, the optical engine that forms the image is directly mounted in the housing. Therefore, in order to correct the displacement or deformation of the image projected on the transmission-type screen (due to the variation of the projection angle) after the optical engine is mounted in the housing, it is necessary to adjust the position of an image display device such as liquid crystal display or digital mirror device (DMD) provided in the optical engine, or to adjust the angle of a projection optical system such as a projection lens, a reflection mirror or the like. In this case, the position or angle of the relatively small components must be adjusted, and therefore the adjustment is difficult to operate.

In order to facilitate the adjustment of the projection angle, there is proposed a rear projector in which an engine supporting plate for placing the optical engine and a supporting table with an inclination position adjusting mechanism capable of adjusting the inclination angle of a supporting surface of the supporting plate are provided in the housing. After the optical engine is placed on the engine supporting plate, the inclination angle of the engine supporting plate is adjusted by means of the inclination position adjusting mechanism of the supporting table to adjust the orientation of the optical engine. With this, the projection angle is adjusted and the deformation of the image displayed on the transmission-type screen is corrected, so that the entire image displayed on the transmission-type screen is optimized. Such a rear projector is disclosed in, for example, Japanese Laid-Open Patent Publication No. 2003-337379 (see, paragraph 0008 and FIG. 13).

For example, with the inclination position adjusting mechanism disclosed in the above described publication, the lengths of screws of two predetermined rods selected among four rods (i.e., adjusting mechanism) disposed on four corners of the engine supporting plate are adjusted in synchronization with each other, so as to adjust the angle of the engine supporting plate in the vertical direction about a predetermined horizontal axis. Further, in order to enable the adjustment of the inclination of the optical engine in the horizontal direction (left-to-right direction), the engine supporting plate has two-layer structure and the upper plate is slidable. The inclination of the optical engine in the horizontal direction can be adjusted by slidably adjusting the upper plate with respect to the lower plate, and by fixing the upper plate to the lower plate using screws.

However, with the above described inclination position adjusting mechanism, it is necessary to adjust the lengths of the screws of two rods (among four rods) in synchronization with each other for adjusting the angle about the predetermined horizontal axis in the manufacturing process, and therefore the adjusting operation takes a long time. Moreover, in order to horizontally rotate (adjust) the engine supporting plate about the axis perpendicular to the surface of the engine supporting plate, the engine supporting plate need to have two layer structure and the upper plate need to be slidable. Therefore, the rear projector has a complicated structure and includes a large number of components, with the result that the rear projector becomes heavier and more expensive.

SUMMARY OF THE INVENTION

An object of the present invention is to provide a projection apparatus having an angle adjusting mechanism capable of adjusting an angle of an optical engine in a short time, facilitating the adjusting in a manufacturing process, having a small number of components, and having a simple structure.

The present invention provides a projection apparatus including a housing, a transmission-type screen provided on a front side of the housing, and an optical engine provided in the housing which projects an image on the transmission-type screen from a rear side of the transmission-type screen. The projection apparatus further includes an engine supporting plate on which the optical engine is placed. The engine supporting plate is provided in the housing so that an angle of the engine supporting plate is adjusted to thereby adjust a projecting direction of the optical engine. The projection apparatus further includes a base portion provided on an inner bottom surface of the housing, and an adjusting member having a substantially wedge-shape with nonparallel upper and lower surfaces. The adjusting member is inserted into between the base portion and a lower surface of the engine supporting plate, so that front or rear end of the engine supporting plate is vertically rotatable. The projection apparatus further includes a front-to-rear position adjusting unit capable of pushing the adjusting member frontward and pulling the adjusting member rearward, a slope portion having a slope surface that gradually increases or decreases an angle of a surface of the adjusting member that contacts the engine supporting plate in accordance with a movement of the adjusting member in front-to-rear direction, and a fixing unit that fixes the engine supporting plate to an adjusted position.

With such an arrangement, the projection apparatus has a simple structure and includes a small number of components and small number of connected portions, and therefore it becomes possible to reduce the weight and the cost of the projection apparatus. Further, in the manufacturing process, the workability of the assembling and adjusting of the adjusting mechanism can be enhanced, and the working time can be reduced. Further, the accumulation of assembling errors can be reduced, and therefore it becomes possible to ensure the accuracy in the inclination angle and the rotating direction of the optical engine and rigidity after assembling. Moreover, after adjustment, the engine supporting plate can be surely fixed using fixing unit without causing the deformation of the engine supporting plate.

BRIEF DESCRIPTION OF THE DRAWINGS

In the attached drawings:

FIG. 4 is a perspective view of the angle adjusting mechanism in an initial state before the adjustment of the angle of the engine supporting plate;

DETAILED DESCRIPTION OF THE PREFERRED EMBODIMENT

Embodiments of the present invention will be described with reference to the attached drawings.

Embodiment 1

Figure 1:
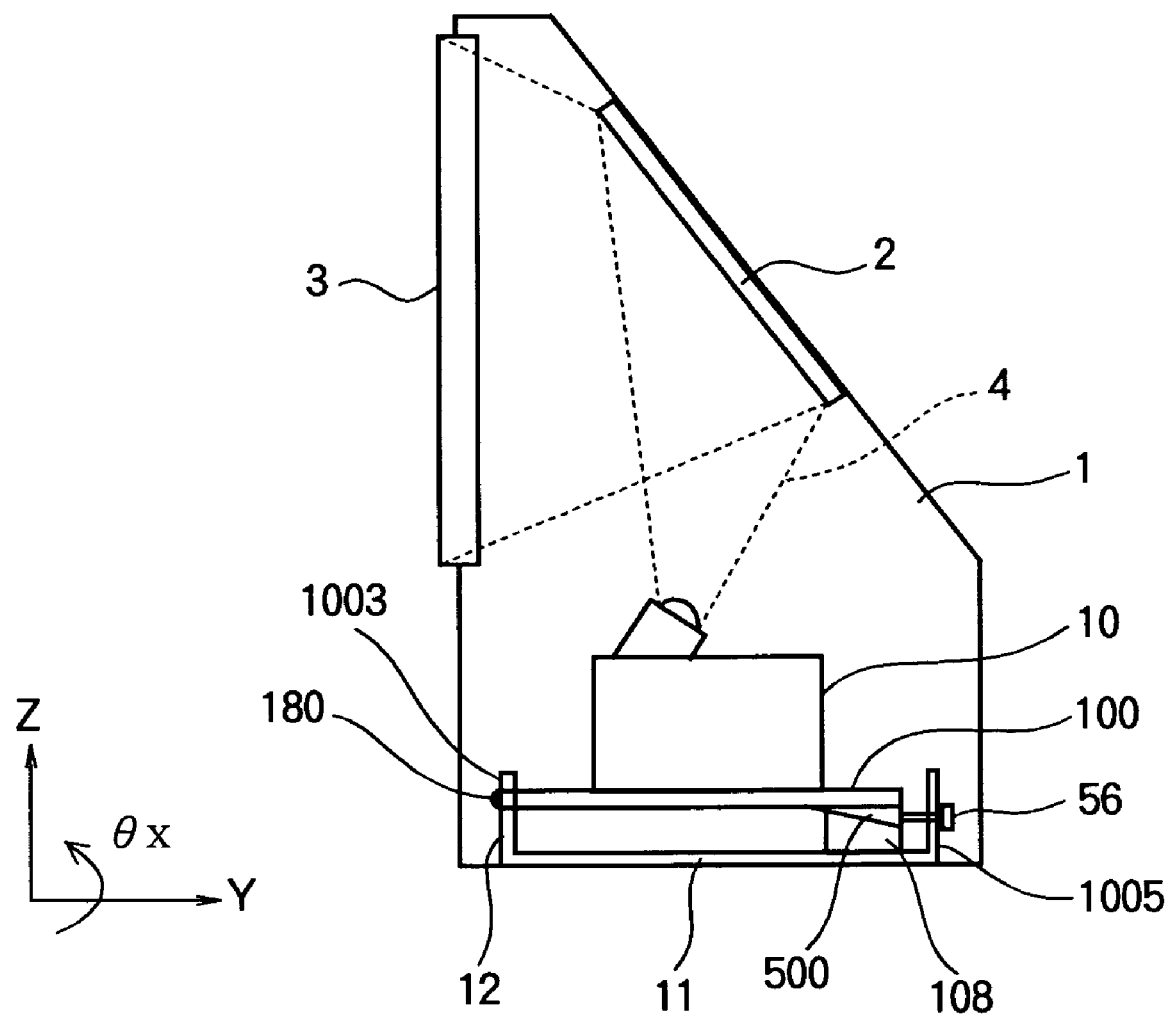
FIG. 1 is a sectional view of a rear projector having an angle adjusting mechanism of an optical engine according to Embodiment 1 of the present invention.

FIG. 1 is a sectional view showing a rear projector having an angle adjusting mechanism of an optical engine according to Embodiment 1 of the present invention.

In the projection apparatus of Embodiment 1 shown in FIG. 1, a light 4 emitted by an optical engine 10 is enlarged by a projection lens, reflected by a backside mirror 2, and projected toward a transmission-type screen 3 from rear side. The transmission-type screen 3 is provided on a front side (i.e., on the negative side along Y-axis shown in FIG. 1) of a housing 1. The screen 3 transmits the light (incident on the rear side at a predetermined angle) and emits the light to the front, to thereby display the image on the screen 3. An engine supporting plate 100 is provided in the housing 1. The optical engine 10 is placed on the engine supporting plate 100 in such a manner that an angle of the optical engine 10 is adjusted so that the projecting direction is directed in an appropriate direction.

The housing 1 is a box-shaped case in which the optical engine 10 (that projects the light 4 to form the image) is housed. The housing 1 has the screen 3 on the front side thereof. The backside mirror 2 is held at the inner rear surface of the housing 1 at a predetermined angle so that the backside mirror 2 reflects the light 4 at a predetermined angle. The screen 3 is of the transmission-type and displays the image using the light 4 projected from the rear side. The screen 3 is mounted on the front side of the housing 1 by means of, for example, a screen vessel.

Figure 2:
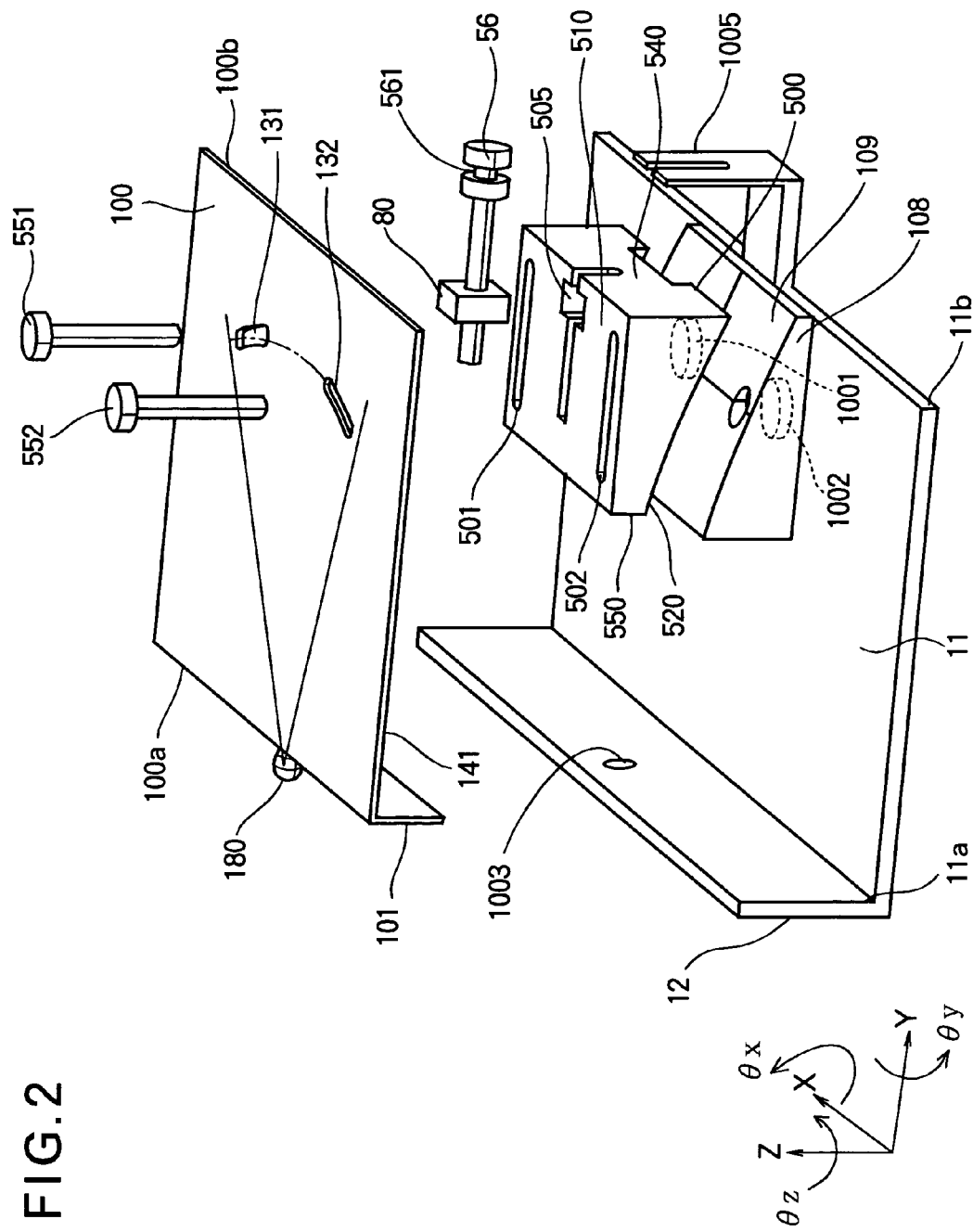
FIG. 2 is a perspective view of the angle adjusting mechanism for adjusting the angle of an engine supporting plate provided in a rear projector shown in FIG. 1.

FIG. 2 is a perspective view showing a main part of an angle adjusting mechanism for adjusting the angle of the engine supporting plate 100 provided in the rear projector of FIG. 1.

In FIG. 2, for the convenience of the explanation and for facilitating understanding of the respective components, the optical engine 10, electric components, a cooling fan (and a duct), a cover and the like are not shown.

The optical engine 10 is housed in the housing 1, and emits the light 4 (for forming the image) to the screen 3 from the rear side of the screen 3. A base portion 11 is provided on the inner bottom surface of the housing 1, for supporting the engine supporting plate 100 at a predetermined angle. The base portion 11 is formed integrally with or separately from the housing 1. A base bending portion 12 is bent upward (i.e., raised) at a front end 11a of the base portion 11 along the inner bottom surface of the housing 11.

A front-to-rear position adjusting screw 56 (i.e., a front-to-rear position adjusting unit) penetrates a U-shaped cutout groove formed on a base bending protrusion 1005 of the base portion 11. The front-to-rear position adjusting screw 56 reaches the adjusting member 500. By rotating the front-to-rear position adjusting screw 56 clockwise or counterclockwise, the adjusting member 500 is slidably pushed frontward or pulled rearward. Therefore, the position of the adjusting member 50 in the front-to-rear direction can be adjusted.

The engine supporting plate 100, on which the optical engine 10 is placed, is provided in the housing 1. The angle of the surface of the engine supporting plate 100 on which the optical engine 10 is placed is adjusted so that the direction at which the optical engine 10 emits the light 4 is directed to a direction at an appropriate predetermined angle.

A slope portion 108 is fixed to an upper surface of the base portion 11 on the inner bottom surface of the housing 1. The slope portion 108 has a slope surface 109 (described later with reference to FIG. 3) that gradually increases or decreases the angle of a contact surface of the adjusting member 500 (that contacts the engine supporting plate 100) in accordance with the movement of the adjusting member 500 in the front-to-rear direction.

A center shaft protrusion 180 is provided on an end (i.e., a front end portion 100a) of the engine supporting plate 100. The front end portion 100a is opposite to the other end (i.e., a rear end portion 100b) of the engine supporting plate 100 at which the engine supporting plate 100 is rotated in the vertical (upward/downward) direction and horizontal (left-to-right) direction. The center shaft protrusion 180 is convex-shaped and takes the form of a pivot or the like having a dimension such that the center shaft protrusion 180 can be inserted in a center shaft receiving portion 1003 (described below), and forms a rotation axis in the vertical and horizontal directions.

The adjusting member 500 is approximately wedge-shaped and is bounded by nonparallel upper and lower surfaces 510 and 520, relatively wide rear end surface 540, relatively narrow front end surface 550 and both side surfaces. The upper surface 510 (i.e., the surface that does not contact the slope surface 109 of the slope portion 108) is a flat surface. The adjusting member 500 is inserted into between the base portion 11 (provided on the inner bottom surface of the housing 1) and the lower surface 141 of the engine supporting plate 100. By sliding the adjusting member 500 in the front-to-rear direction in contact with the slope surface 109 of the slope portion 108 by the front-to-rear position adjusting screw 56 (i.e., the front-to-rear position adjusting unit), the rear end portion 100b of the engine supporting plate 100 is vertically rotated.

The center shaft receiving portion 1003 is formed on the base portion 11 in the form of a concave or a through-hole in which the center shaft protrusion 180 can be inserted. The center shaft receiving portion 1003 receives the center shaft protrusion 180, to form the rotation axis.

The base bending protrusion 1005 is formed on the rear end 11b of the base portion 11 (along the inner bottom surface of the housing 1), and is bent and raised upward from the base portion 11. The base bending protrusion 1005 has the U-shaped cutout groove cut from a top end of the bending portion 1005.

In a modification (not shown), the center shaft protrusion 180 can be formed on the front end 11a of the base plate 11 that faces one end (i.e., the front end portion 100a) of the engine supporting plate 100 opposite to another end (i.e., the rear end portion 100b) at which the engine supporting plate 100 is rotated in the vertical direction. In such a case, the center shaft receiving portion 1003 can be formed on the engine supporting plate 100 so that the center shaft receiving portion 1003 receives the center shaft protrusion 180 to form the rotation axis.

In the angle adjusting mechanism of this embodiment, the front end portion 100a (i.e., an end in the direction of Y-axis) of the engine supporting plate (i.e., an engine base) 100 is bent downward, and forms a bending portion 101. The center shaft protrusion 180 is formed in the vicinity of the center of the bending portion 101.

In FIG. 2, the center shaft protrusion 180 formed on the bending portion 101 on the front end portion 100a engages the center shaft receiving portion 1003 formed in the vicinity of the base bending portion 12 of the base portion 11. With such an engagement, the engine supporting plate 100 is supported so that the engine supporting plate 100 is rotatable in the directions θx, θy and θz. Arcuate elongated holes 131 and 132 are formed on the engine supporting plate 100. The arcuate elongated holes 131 are in the form of arcs whose centers are aligned with the center shaft protrusion 180. The length of the arcuate elongated holes 131 and 132 are sufficient enough to cover the range of the adjusting angle in the horizontal direction. The rear end portion 100b of the engine supporting plate 100 is supported by the adjusting member 500 after adjustment.

The adjusting member 500 is approximately in the form of a wedge, and has the upper surface 510 (as a first surface) which is flat and the lower surface 520 (as a second surface) having an arcuate shape in longitudinal cross section with a certain curvature.

The adjusting member 500 has a concave 505. An adjusting screw nut 80 is disposed in the concave 505 and engages the front-to-rear position adjusting screw 56. A pair of elongated holes 501 and 502 are formed on the adjusting member 500 and vertically penetrate the adjusting member 500. The elongated holes 501 and 502 extend in front-to-rear direction (i.e., along Y-axis) in the form of elongated cylindrical holes. The lengths of the elongated holes 501 and 502 in the front-to-rear direction are so determined that the adjusting member 500 is adjustable in the adjustable range of the front-to-rear direction in a state where fixing bolts 551 and 552 (fixed to the slope portion 108) penetrate the elongated holes 501 and 502. The widths of the elongated holes 501 and 502 are so determined that the penetrating fixing bolts 551 and 552 can freely move in the elongated holes 501 and 502 without causing a resistance on the movement of the adjusting member 500 in the front-to-rear direction, and that the adjusting member 500 is not inclined.

In order to fix the engine supporting plate 100 at an adjusted position, the pair of fixing bolts (fixing unit) 551 and 552 respectively penetrate the arcuate elongated holes 131 and 132 of the engine supporting plate 100 and the elongated holes 501 and 502 of the adjusting member 500, and engage fixing nuts 1001 and 1002 buried in the slope portion 108.

The pair of fixing nuts 1001 and 1002 are buried in a part of the slope portion 108, and respectively engage the fixing bolts 551 and 552, so that the engine supporting plate 100 is fixed to the adjusting member 500.

A narrow neck portion 561 of the front-to-rear position adjusting screw 56 (that engages the adjusting screw nut 80) engage the U-shaped cutout groove on the base bending protrusion 1005.

In the angle adjusting mechanism of this embodiment, the front-to-rear position adjusting screw 56 (i.e., the front-to-rear position adjusting mechanism) and the fixing bolts 551 and 552 (i.e., the fixing mechanism) for fixing the engine supporting plate 100 and the adjusting member 500 at the predetermined position are provided in the vicinity of the rear end portion 100b of the engine supporting plate 100. Therefore, the front-to-rear position adjusting screw 56 and the fixing bolts 551 and 552 are easy to access after the assembling is completed (i.e., after the optical engine 100 and other components are mounted on the engine supporting plate 100), and therefore the adjustment can be easily operated.

In the angle adjusting mechanism of this embodiment, it is possible to adjust the angle of the engine supporting plate 100 in the vertical rotational direction (i.e., the direction θx in FIG. 2) about the center shaft protrusion 180, by sliding the adjusting member 500 in the front-to-rear direction. Further, it is possible to adjust the angle of the engine supporting plate 100 in the horizontal direction (i.e., the direction θz in FIG. 2) by means of the arcuate elongated holes 131 and 132 formed on the engine supporting plate 100. However, it is not possible to adjust the angle in the direction θy in FIG. 2. If the center shaft protrusion 180 is provided only, the engine supporting plate 100 can be rotated in, the direction θy. However, since the upper surface 510 of the adjusting member 500 that supports the rear end portion 100b side of the engine supporting plate 100 is flat (so that the engine supporting plate 100 can not be inclined in the left-to-right direction), the engine supporting plate 100 can not rotate in the direction θy in FIG. 2. In order to explain the reason, the displacement and distortion of the projected image will be described.

The light 4 emitted by the optical engine 10 is enlarged by the projection lens, reflected by the backside mirror 2 and projected on the screen 3. Therefore, in order to display the image (projected on the screen 3) at the correct position, the relative positions and relative angles among the optical engine 10, the backside mirror 2 and the screen 3 are important. For example, even if the backside mirror 2 and the screen 3 are slightly inclined, the angle of the light 4 changes, with the result that the position of the image projected on the screen 3 may be displaced from the correct position, or the shape of the image (correctly having a square shape) may be distorted into trapezoid.

In this regard, the optical properties of the optical engine 10 include a distortion of the image. Further, the housing 1 includes a plurality of parts. The assembling errors, dimensional errors and distortions of the parts may cause a deviation of the relative positions among the optical engine 10, the mirror 2 and the screen 3 from the ideal condition. As a result, the displacement or the distortion of the image may occur.

FIG. 3A through 3D are schematic views illustrating examples of the displacement and trapezoidal distortion of the image formed by the projection apparatus.

Figure 3A:
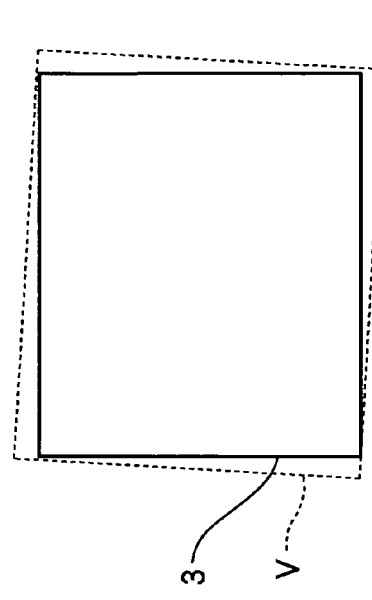
FIG. 3A shows a displacement of a projected image toward the upper left with respect to the screen.
Figure 3B:
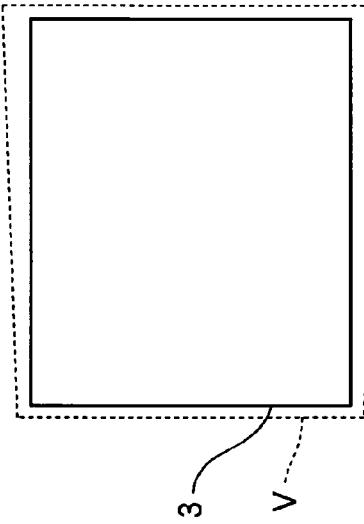
FIG. 3B shows a rotational displacement of the projected image in the clockwise direction with respect to the screen.
Figure 3C:
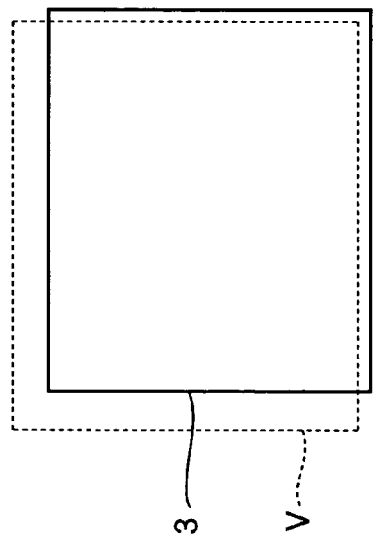
FIG. 3C shows a trapezoid distortion (vertical keystone distortion) in which a projected image becomes expanded toward the lower side with respect to the screen.
Figure 3D:
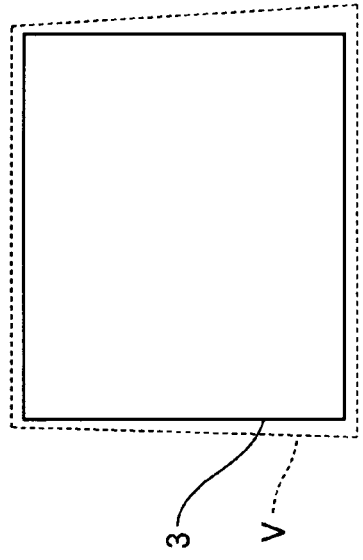
FIG. 3D shows a trapezoid distortion (horizontal keystone distortion) in which a projected image becomes expanded toward the right side with respect to the screen.

FIG. 3A shows the state where the position of the projected image V is displaced obliquely in the upper left direction with respect to the screen 3. FIG. 3B shows the state where the position of the projected image V is displaced in the clockwise rotational direction with respect to the screen 3. FIG. 3C shows the state where the projected image V is distorted into a trapezoid widened toward the bottom (i.e., a vertical keystone distortion). FIG. 3D shows the state where the projected image V is distorted into a trapezoid widened toward the right (i.e., a horizontal keystone distortion).

As described above, the displacement or distortion of the projected image can be classified under four groups: the displacement as shown in FIG. 3A, the rotational displacement as shown in FIG. 3B, the vertical keystone distortion as shown in FIG. 3C and the horizontal keystone distortion as shown in FIG. 3D.

However, the lateral and vertical dimensions of the projection area of the optical system are designed to be larger than the lateral and vertical dimensions of the screen 3 by a sufficient margin, and therefore the distortion shown in FIG. 3A does not cause a defect in the image projected on the screen 3. Accordingly, the observer hardly notices the displacement of the image. As a result, it is not necessary to correct the displacement of the image (FIG. 3A) in general.

In contrast, the rotational displacement as shown in FIG. 3B causes vertical sides and horizontal sides to be inclined at angles when, for example, a lattice-shaped image is displayed. Therefore, the observer easily notices the rotational displacement of the image. Accordingly, it is necessary to correct the rotational displacement of the image (FIG. 3B). This correction is carried out by rotating the engine supporting plate 100 in the direction θz in FIG. 2.

The vertical keystone distortion as shown in FIG. 3C and the horizontal keystone distortion as shown in FIG. 3D are caused by the inclination of the optical engine, backside mirror and the screen. However, the housing 1 has a bilaterally-symmetrical shape in general, and therefore the molding distortion hardly occurs in the left-to-right direction. Accordingly, the rotational displacement (i.e., the displacement of angle) of the mirror and the screen hardly occurs in the left-to-right direction, with the result that it is unlikely that the horizontal keystone distortion (FIG. 3D) occurs. As a result, it is not necessary to correct the horizontal keystone distortion.

In contrast, the shape of the housing 1 is not vertically asymmetrical in general, and therefore there is a large possibility that the molding distortion may occur in the vertical direction. In other words, there is a large possibility that the rotational displacement of the mirror and the screen may occur in the vertical direction, with the result that it is likely that the vertical keystone distortion (FIG. 3C) occurs. As a result, it is necessary to correct the vertical keystone distortion. This correction is carried out by rotating the engine supporting plate 100 in the direction θx in FIG. 2.

As described above, it is understood that the angle of the optical engine 10 (i.e., the angle of the engine supporting plate 100) only needs to be adjusted in the direction θx to correct the vertical keystone distortion and in the direction θz to correct the rotational displacement in the coordinate system of FIG. 2.

Therefore, in the projection apparatus of this embodiment, the angle of the optical engine 10 is adjusted in the vertical rotational direction (i.e., the direction θx in FIG. 2) and in the horizontal rotational direction (i.e., the direction θz in FIG. 2) using the angle adjusting mechanism, so as to adjust the angle of the light 4 emitted from the projection lens and to correct the displacement and distortion of the image projected on the screen 3 among the displacement and distortion shown in FIGS. 3A through 3D.

Next, the angle adjusting operation using the angle adjusting mechanism of this embodiment will be described with reference to FIG. 4 through FIG. 10.

Figure 5:
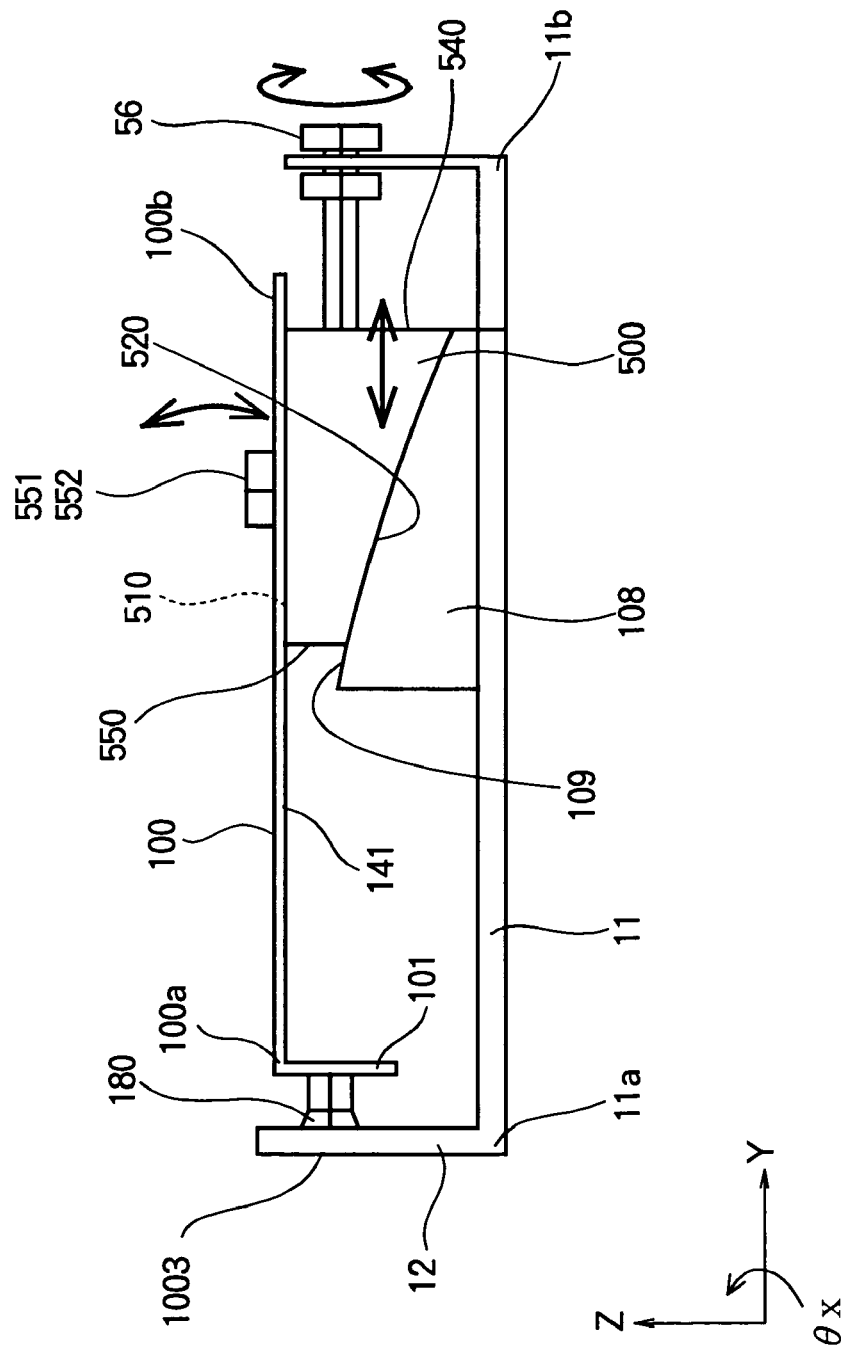
FIG. 5 is a side view of the angle adjusting mechanism shown in FIG. 4.

FIGS. 4 and 5 are a perspective view and a side view showing an initial state before the adjustment of the angle of the engine supporting plate 100 by means of the angle adjusting mechanism shown in FIG. 3.

By rotating the front-to-rear position adjusting screw 56 counterclockwise (i.e., a loosening direction) and clockwise (i.e., a fastening direction), the adjusting member 500 moves in the front-to-rear direction. As a result, the adjusting member 500 moves upward in the positive Z (+Z) direction along the slope surface 109 of the slope member 108, and moves downward in the negative Z (−Z) direction along the slope surface 109 of the slope member 108.

In the state shown in FIGS. 4 and 5, the adjusting member 500 is located in the vicinity of the center in the adjustable range in the front-to-rear direction, and the angle of the engine supporting plate 100 is at the center of the adjustable range of the angle. By rotating the front-to-rear position adjusting screw 56 from this initial state, the adjusting member 500 moves in the front-to-rear direction to thereby change the angle of the engine supporting plate 100, so that the optical engine 10 rotates in the vertical rotating direction (i.e., the direction θx). As a result, the angle of the optical engine 10 is adjusted in the vertical direction, so that the vertical keystone distortion can be corrected.

During this angle adjustment, the fixing bolts 551 and 552 (fixing unit) are not yet fastened. The fixing bolts 551 and 552 are so loosened that the lower surface 520 of the adjusting member 500 can slide along the slope surface 109 of the slope member 108 in the front-to-rear direction and the engine supporting plate 100 can slide along the upper surface 510 of the adjusting member 500 both in the front-to-rear direction.

Figure 6:
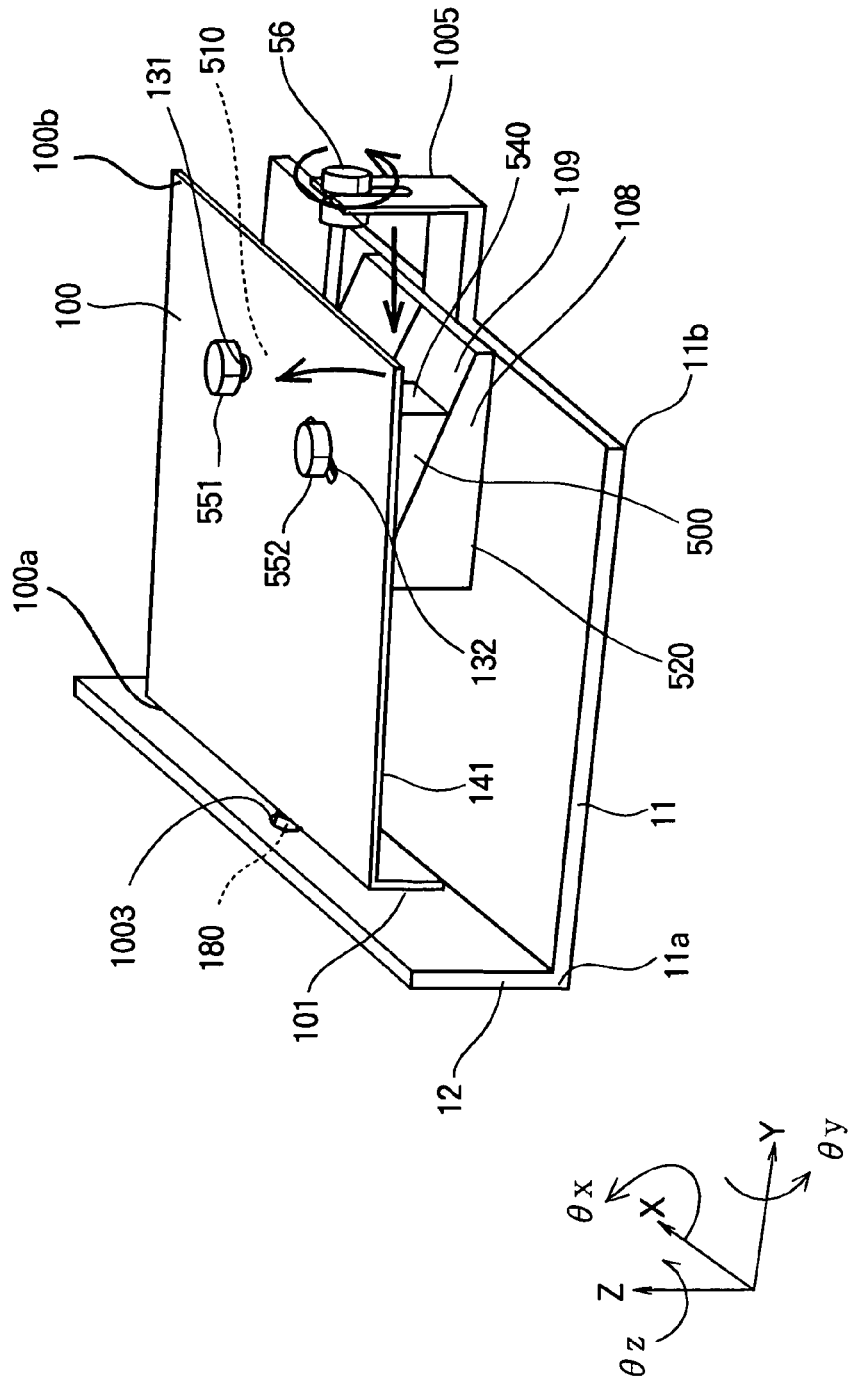
FIG. 6 is a perspective view showing the angle adjusting mechanism rotating the engine supporting plate at an angle θa in a positive (upward) vertical rotating direction θx to adjust the angle in the vertical direction in order to correct the vertical keystone distortion of the projected image.
Figure 7:
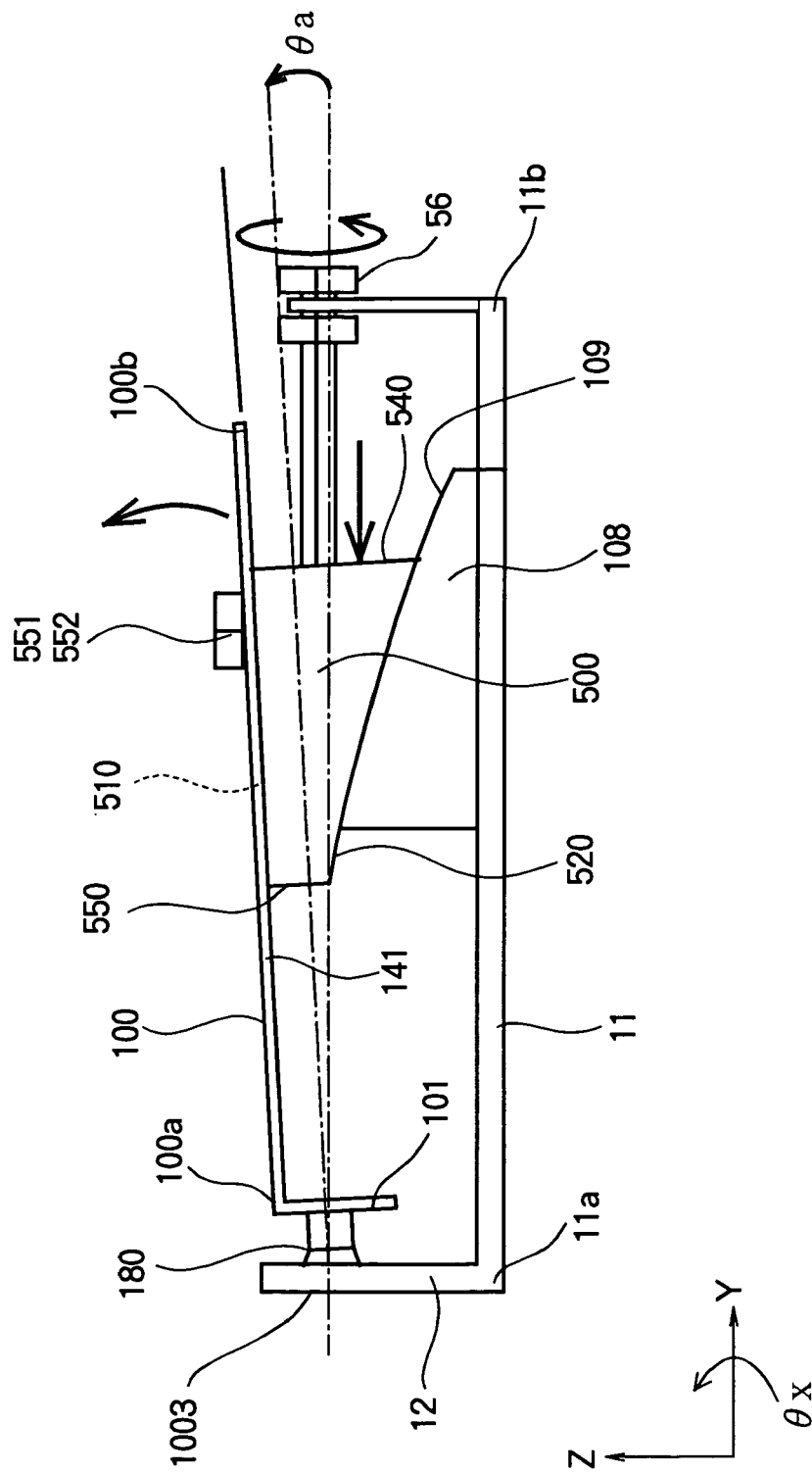
FIG. 7 is a side view of the angle adjusting mechanism shown in FIG. 6.

FIGS. 6 and 7 are a perspective view and a side view showing the state where the angle adjusting mechanism rotates the engine supporting plate 100 in the vertical rotating direction (i.e., the direction θx) by an angle θa upward (i.e., in the positive direction) to correct the angle in the vertical direction, for correcting the vertical keystone distortion.

In order to rotate the optical engine (not shown) placed on the engine supporting plate 100 shown in FIGS. 4 and 5 in the direction θx in the positive direction (upward) to thereby incline the optical engine, the front-to-rear position adjusting screw 56 is rotated counterclockwise (in the loosening direction) as shown in FIGS. 6 and 7. The head of the front-to-rear position adjusting screw 56 is rotatable, but does not move in the front-to-rear direction due to the engagement with the U-shaped cutout groove of the base bending protrusion 1005. Therefore, the adjusting member 500 in which the screw nut 80 is buried moves in the negative Y direction in FIGS. 6 and 7. With this, the adjusting member 500 moves upward in the positive Z direction along the slope surface 109 of the slope member 108.

The lower surface 520 of the adjusting member 500 and the slope surface 109 have arcuate shapes in cross section. Therefore, when the adjusting member 500 moves frontward and upward along the slope surface 109, the angle of the flat upper surface 510 about the center shaft protrusion 180 (the center shaft receiving portion 1003) is changed, and the flat upper surface 510 pushes the engine supporting plate 100 upward. Therefore, the engine supporting plate 100 is inclined at an angle θa about the center shaft protrusion 180 as shown in FIG. 7.

In this case, the arcuate shapes (in cross section) of the lower surface 520 of the adjusting member 500 and the slope surface 109 have the same curvature so that the flat surface 510 of the adjusting member 500 is inclined at an angle corresponding to the inclination of the engine supporting plate 100. Therefore, the lower surface 141 of the engine supporting plate 100 and the upper surface 510 of the adjusting member 500 are constantly kept in contact (surface contact) with each other.

Figure 8:
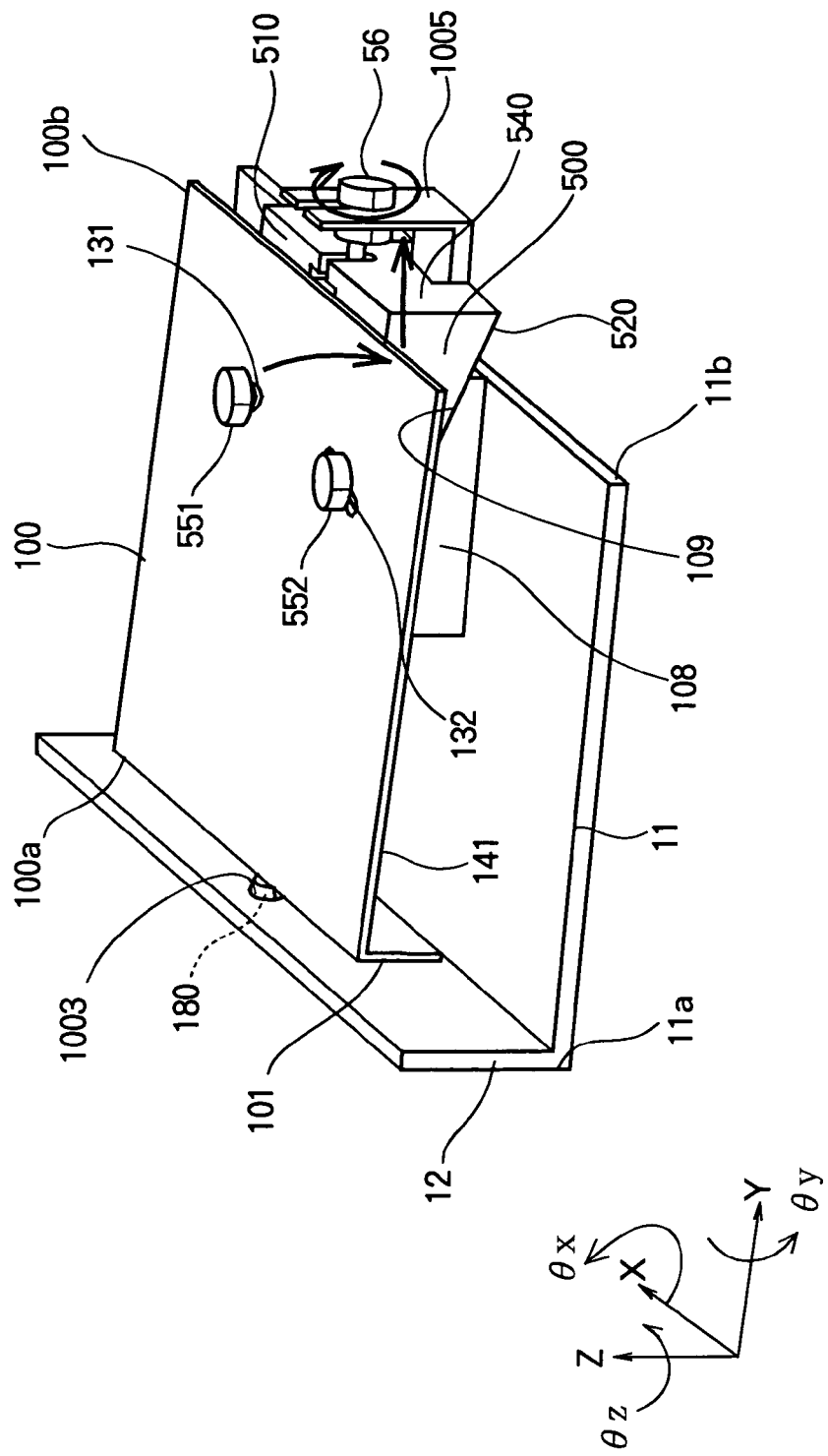
FIG. 8 is a perspective view showing the angle adjusting mechanism rotating the engine supporting plate at an angle θb in a negative (downward) vertical rotating direction θx to adjust the angle in the vertical direction in order to correct the vertical keystone distortion of the projected image.
Figure 9:
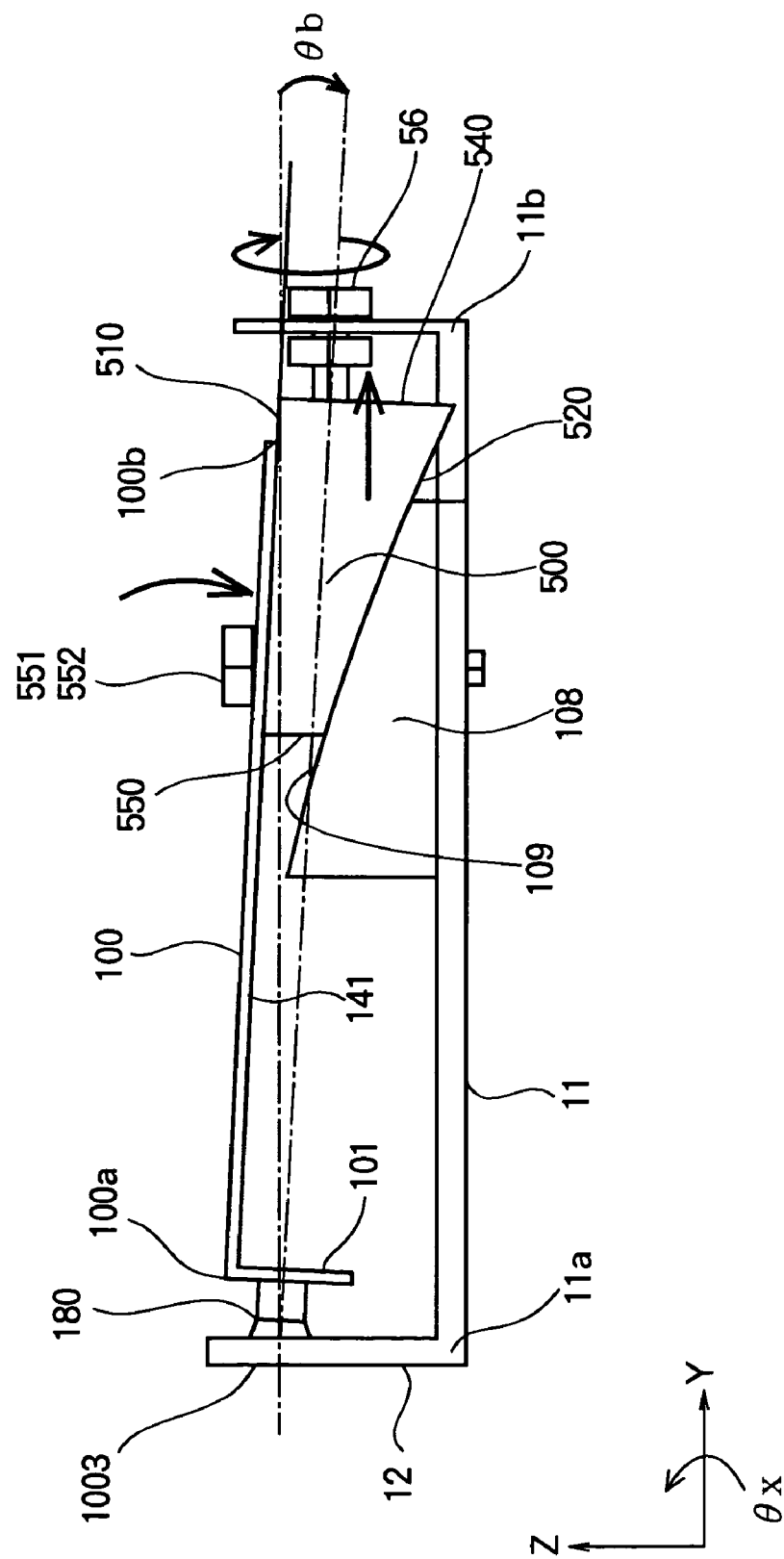
FIG. 9 is a side view of the angle adjusting mechanism shown in FIG. 8.

FIGS. 8 and 9 are a perspective view and a side view showing the state where the angle adjusting mechanism rotates the engine supporting plate 100 in the vertical rotating direction (i.e., the direction θx) by an angle θb downward (i.e., in the negative direction) to correct the angle in the vertical direction, for correcting the vertical keystone distortion.

In order to rotate the optical engine (not shown) in the direction θx in the negative direction (downward) to thereby incline the optical engine, the front-to-rear position adjusting screw 56 is rotated clockwise (in the fastening direction) as shown in FIGS. 8 and 9. The head of the front-to-rear position adjusting screw 56 does not move in the front-to-rear direction, and the adjusting member 500 in which the screw nut 80 (relatively movable with respect to the head of the front-to-rear position adjusting screw 56) is buried moves in the positive Y direction in FIGS. 8 and 9. With this, the adjusting member 500 moves downward in the negative Z direction along the slope surface 109 of the slope member 108.

The lower surface 520 of the adjusting member 500 and the slope surface 109 have arcuate shapes in cross section, and therefore, when the adjusting member 500 moves rearward and downward along the slope surface 109, the angle of the flat upper surface 510 about the center shaft protrusion 180 (the center shaft receiving portion 1003) is changed, and the engine supporting plate 100 follows the downward movement of the flat upper surface 510 of the adjusting member 500. Therefore, the engine supporting plate 100 inclined at an angle θb about the center shaft protrusion 180 as shown in FIG. 9.

In this case, the arcuate shapes (in cross section) of the lower surface 520 of the adjusting member 500 and the slope surface 109 have the same curvature so that the flat surface 510 of the adjusting member 500 is inclined at an angle corresponding to the inclination of the engine supporting plate 100. Therefore, the lower surface 141 of the engine supporting plate 100 and the upper surface 510 of the adjusting member 500 are constantly kept in contact (surface contact) with each other.

Figure 10:
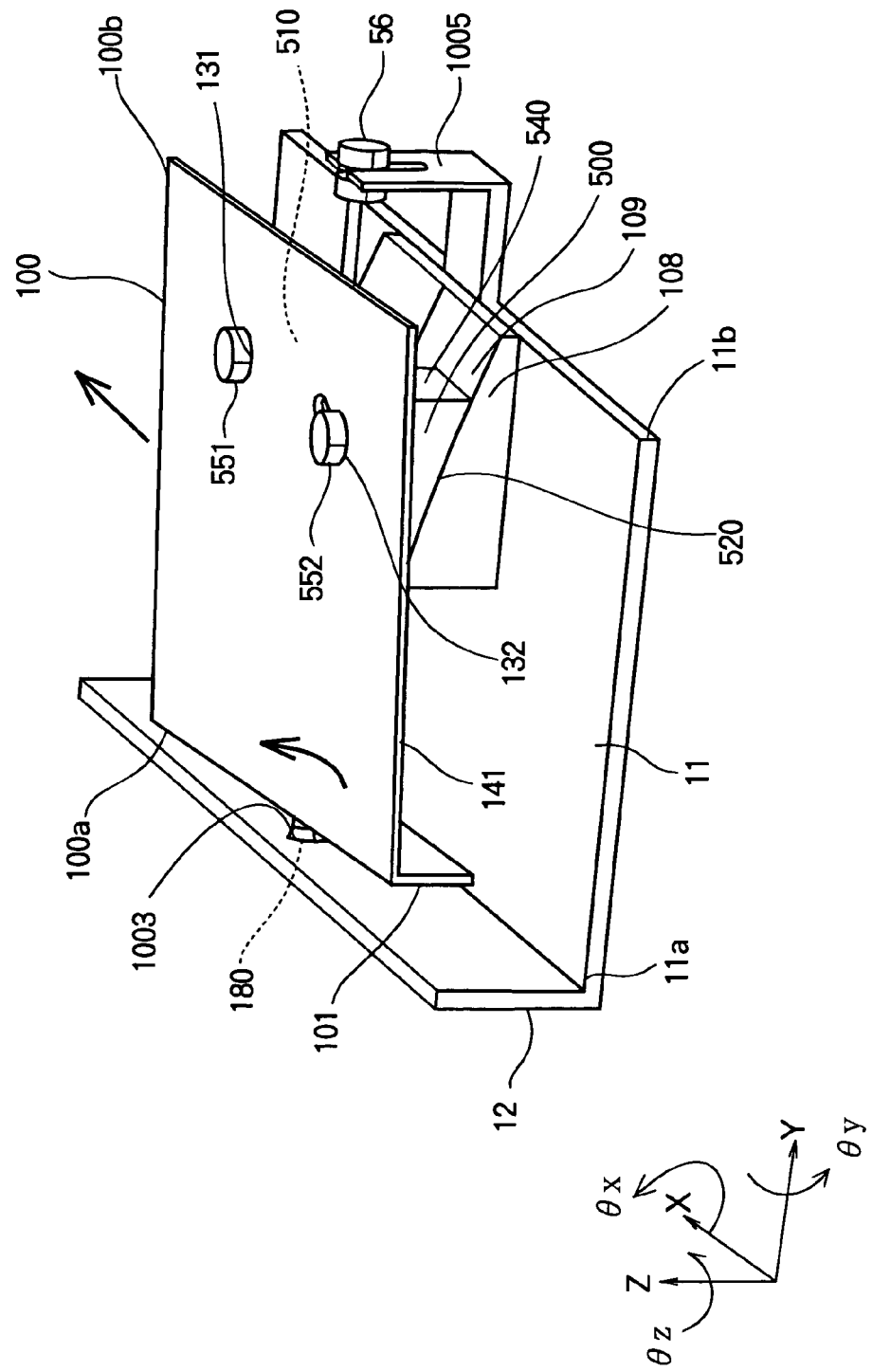
FIG. 10 is a perspective view showing the angle adjusting mechanism rotating the engine supporting plate counterclockwise in a horizontal rotating direction θz to adjust the angle in the horizontal direction in order to correct the rotation displacement of the projected image.

FIG. 10 is a perspective view showing the state where the angle adjusting mechanism rotates the engine supporting plate 100 counterclockwise in the horizontal rotating direction (i.e., the direction θz) to correct the angle in the horizontal direction, for correcting the rotational displacement of the projected image.

During this angle adjustment, the fixing bolts 551 and 552 are not fastened, but loosened so that the engine supporting plate 100 is slidable in the left-to-right direction on the upper surface 510 of the adjusting member 500.

In FIG. 10, when the operator pushes the rear end portion of the engine supporting plate 100 to the right (in the positive X direction in FIG. 10), the engine supporting plate 100 slidably rotates in the direction θz about the center shaft protrusion 180 on the upper surface 510 of the adjusting member 500.

The fixing bolts 551 and 552 penetrate the arcuate elongated holes 131 and 132 of the engine supporting plate 100, and therefore the engine supporting plate 100 does not rotate beyond the lengths of the elongated holes 131 and 132. In other words, the rotatable angle of the engine supporting plate 100 is limited by the lengths of the elongated holes 131 and 132, and therefore the engine supporting plate 100 does not rotate beyond the predetermined range in the direction θz. With this, the optical engine is rotated in the horizontal direction to adjust the angle for correcting the rotational displacement of the projected image.

After the adjustment in the vertical rotating direction θx and in the horizontal rotating direction θz are carried out as described above, the fixing bolts 551 and 552 are fastened, so that the engine supporting plate 100 (i.e., the optical engine) is fixed in the vertical rotating direction and in the horizontal rotating direction.

Moreover, as described above, the lower surface 520 of the adjusting member 500 and the slope surface 109 have the arcuate shapes (in cross section) of the same curvature, and the upper surface 510 of the adjusting member 500 is inclined at an angle corresponding to the inclination of the engine supporting plate 100, so that the lower surface 141 of the engine supporting plate 100 and the upper surface 510 of the adjusting member 500 are kept in contact (surface contact) with each other. Therefore, even when the fixing bolts 551 and 552 are fastened, it is possible to prevent the damage of a part of the adjusting member 500 and the engine supporting plate 100 due to the mismatch between the upper surface 510 of the adjusting member 500 and the lower surface 141 of engine plate 100.

Here, the method for calculating the arcuate shape (in cross section) of the slope surface 109 and the lower surface 520 of the adjusting member 500 will be described.

Figure 11:
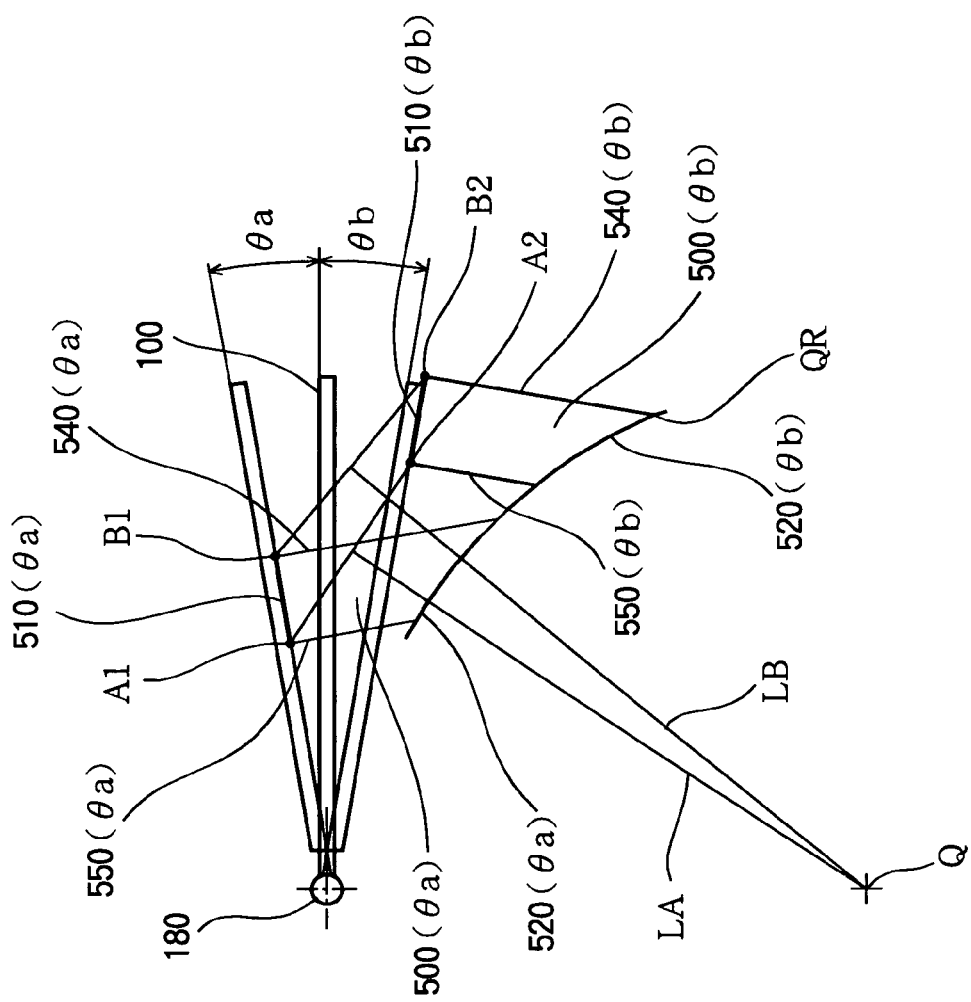
FIG. 11 is a schematic side view showing the engine supporting plate when the engine supporting plate is rotated upward to a maximum angle as shown in FIG. 7 and when the engine supporting plate is rotated downward to a maximum angle as shown in FIG. 9 together with auxiliary lines, with the vertical scale being enlarged.

FIG. 11 is a side view showing the maximum angle θa of the engine supporting plate 100 when the engine supporting plate 100 rotates upward (i.e., in the positive direction) as shown in FIG. 7 and the maximum angle θb when the engine supporting plate 100 rotates downward (i.e., in the negative direction) as shown in FIG. 9. Auxiliary lines are also shown in FIG. 11. In FIG. 11, the vertical scale is enlarged.

In FIG. 11, when the engine supporting plate 100 is rotated upward to the maximum angle θa, the position of the adjusting member 500 (θa) is arbitrarily determined. In this state, the front end of the upper surface 510 (θa) is referred to as A1, and the rear end of the upper surface 510 (θa) is referred to as B1.

Further, when the engine supporting plate 100 is rotated downward to the maximum angle θb, the position of the adjusting member 500 (θb) is arbitrarily determined. In this state, the front end of the upper surface 510 (θb) is referred to as A2, and the rear end of the upper surface 510 (θa) is referred to as B2.

In FIG. 11, "LA" denotes a perpendicular bisector of a line connecting the positions A1 and A2. "LB" denotes a perpendicular bisector of a line connecting the positions B1 and B2. "Q" denotes an intersection of the perpendicular bisector LA and the perpendicular bisector LB. An arc "QR" has a center on the above described intersection Q and has an arbitrary radius so that the arc QR passes the vicinity of the adjusting member 500. A part of the arc QR determines the arcuate shape in cross section.

As described above, the projection apparatus according to this embodiment includes the housing 1, the transmission-type screen 3 provided on the front side of the housing 1, the optical engine 10 provided in the housing 1 for projecting the image on the screen 3 from the rear side of the screen 3, and the engine supporting plate 100 on which the optical engine 10 is placed. The engine supporting plate 100 is provided in the housing 1 so that the projection angle of the optical engine 10 is adjusted. The projection apparatus further includes the base portion 11 provided on the inner bottom surface of the housing 1, and the adjusting member 500 of substantially wedge-shape having nonparallel upper and lower surfaces 510 and 520. The adjusting member 500 is inserted into between the base portion 11 and the lower surface of the engine supporting plate 100, so that the rear end portion 100b of the engine supporting plate 100 is vertically rotated. Further, the projection apparatus includes the front-to-rear position adjusting screw 56 (i.e., the front-to-rear position adjusting unit) capable of pushing the adjusting member 500 frontward and pulling the adjusting member 500 rearward, the slope portion 108 having the slope surface 109 that gradually increases or decreases the angle of the surface of the adjusting member 500 contacting the engine supporting plate 100 in accordance with the movement of the adjusting member 500 in the front-to-rear direction, and the fixing bolts 551 and 552 (i.e., the fixing unit) that fix the engine supporting plate 100 to the adjusted position.

Moreover, the slope surface 109 as a sliding surface is formed on the slope member 108 provided on the upper surface of the base portion 11 on the inner bottom surface of the housing 1. The slope surface 109 is a curved surface having the same curvature as the lower surface 520 of the adjusting member 500. The slope portion 108 is so formed that the slope surface 109 (contacting the adjusting member 500) has the arcuate shape in longitudinal cross section. The adjusting member 500 is so formed that the surface (contacting the slope portion 108) has the arcuate shape in longitudinal cross section corresponding to the arcuate shape of the slope surface 109. The curvature of the arcuate shape is so determined that, when the engine supporting plate 100 is vertically rotated, the angle of the surface 510 (that does not contact the slope surface 109) of the adjusting member 500 follows the change in the angle between the lower surface 141 of the engine supporting plate 100 and the base portion 11.

The slope portion 108 is fixed to the upper surface of the base portion 11 provided on the inner bottom surface of the housing 1. The adjusting member 500 is slid in the front-to-rear direction in contact with the slope surface 109 by the front-to-rear position adjusting screw 56 as the front-to-rear position adjusting unit. The adjusting member 500 has the flat upper surface 510 opposite to the lower surface 520 contacting the slope surface 109 of the slope portion 108. The engine supporting plate 100 has the center shaft protrusion 180 in the form of convex at the front end portion 100a of the engine supporting plate 100. The center shaft receiving portion 1003 in the form of concave or through-hole is formed on the base bending portion 12 of the base portion 11 so that the center shaft receiving portion 1003 receives the center shaft protrusion 180. The center shaft protrusion 180 and the center shaft receiving portion 1003 constitute the rotation axis.

In order to rotate the end of the engine supporting plate 100 (that rotates in the vertical direction) also in the horizontal direction, the center shaft protrusion 180 has the shape such that the center shaft protrusion 180 functions as the rotation axis in the vertical and horizontal rotating directions, and the center shaft protrusion 180 has the dimension such that the center shaft protrusion 180 can be inserted in the center shaft receiving portion 1003. The center shaft receiving portion 1003 has the shape and size such that the center shaft receiving portion 1003 can receive the center shaft protrusion 180. The center shaft protrusion 180 is provided on the front end portion 100a of the engine supporting plate 100, and the center shaft receiving portion 1003 is formed on the base portion 11.

As a modification of the structure shown in FIGS. 1 to 11, the positions of the center shaft protrusion 180 and the center shaft receiving portion 1003 can be interchanged. To be more specific, the center shaft protrusion 180 can be formed on the base bending protrusion 12 of the base portion 11 at a position in opposition to the front end of the engine supporting plate 100, and the center shaft receiving portion 1003 can be formed on the engine supporting plate 100 so that the center shaft receiving portion 1003 can receive the center shaft protrusion 180, so as to form the rotation axis.

As described above, according to the projection apparatus of Embodiment 1 of the present invention, the structure can be simplified, the number of components can be reduced, and the number of connecting portions can be reduced. Therefore, it becomes possible to reduce the cost and weight of the projection apparatus. Moreover, the operability of assembling and adjusting the angle adjusting mechanism during the manufacturing process can be enhanced, and the working time can be shortened. Further, the accumulation of assembling errors can be reduced, and therefore the accuracy of adjustment of angle and rotating direction of the optical engine can be enhanced, and the rigidity of the optical engine can be enhanced. Furthermore, after the adjustment, the optical engine can be fixed using fixing bolts without causing the deformation of the engine supporting plate.

Embodiment 2

In the above described Embodiment 1, the lower surface 520 of the adjusting member 500 and the slope surface 109 of the slope portion 108 have the arcuate shapes having the same curvature in cross section. In this regard, it is also possible to vertically rotate the engine supporting plate 100 using one surface having an arcuate shape in cross section, and the other surface can be replaced by a plurality of protrusions that constantly contacts the arcuate-shaped surface with line-contact or point-contact. In the case of point-contact, the protrusions include, for example, at least two points are arranged along the left-to-right direction perpendicular to the front-to-rear direction (i.e., the moving direction of the adjusting member 500). In the case of line-contact, for example, the protrusions linearly contact the surface along the left-to-right direction perpendicular to the front-to-rear direction (i.e., the moving direction of the adjusting member 500). In Embodiment 2, the description will be made to an example in which the lower surface 520 of the adjusting member 500 has the arcuate shape in cross section as was described in Embodiment 1, and a plurality of protrusions are formed on the slope surface 109.

Figure 12:
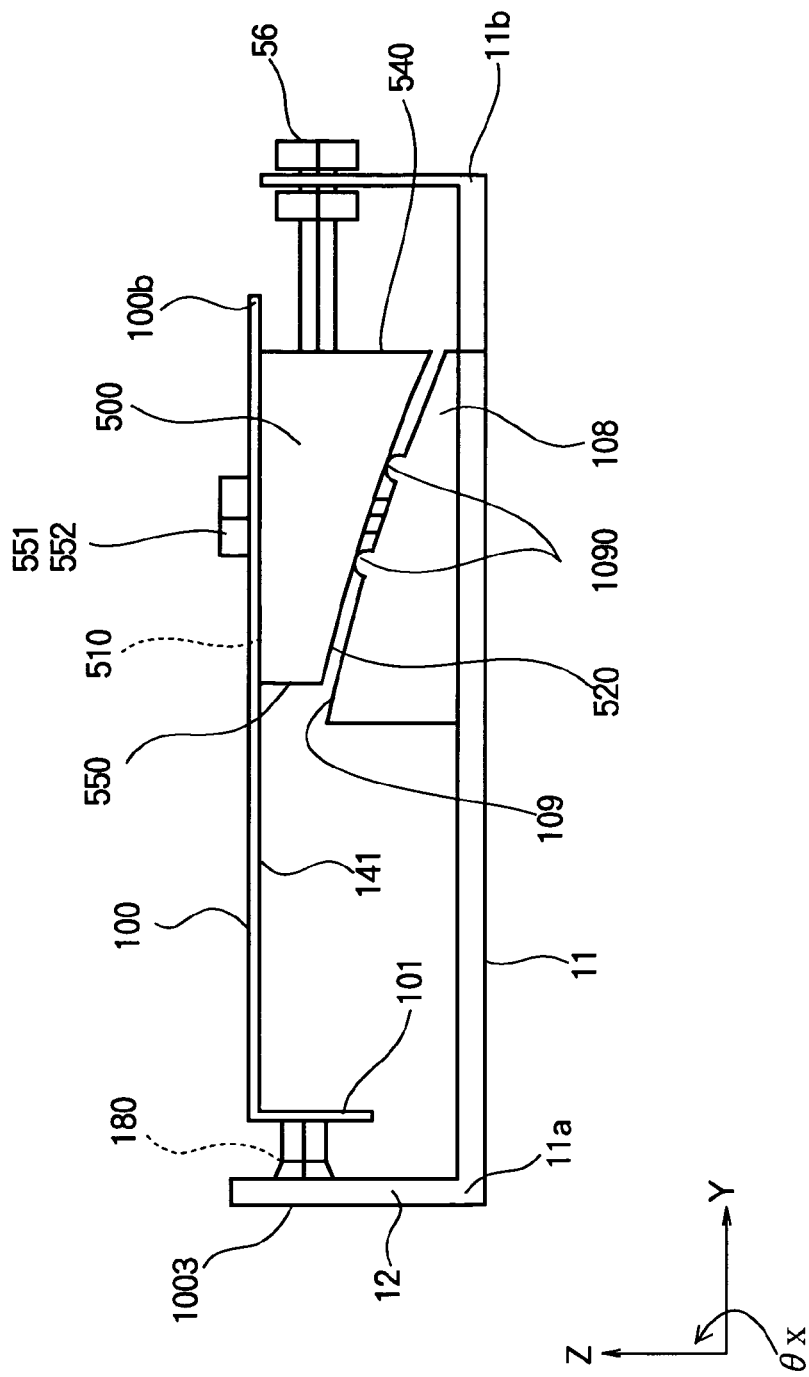
FIG. 12 is a side view of the angle adjusting mechanism according to Embodiment 2 of the present invention in an initial state before the adjustment of the angle of the engine supporting plate.
Figure 13:
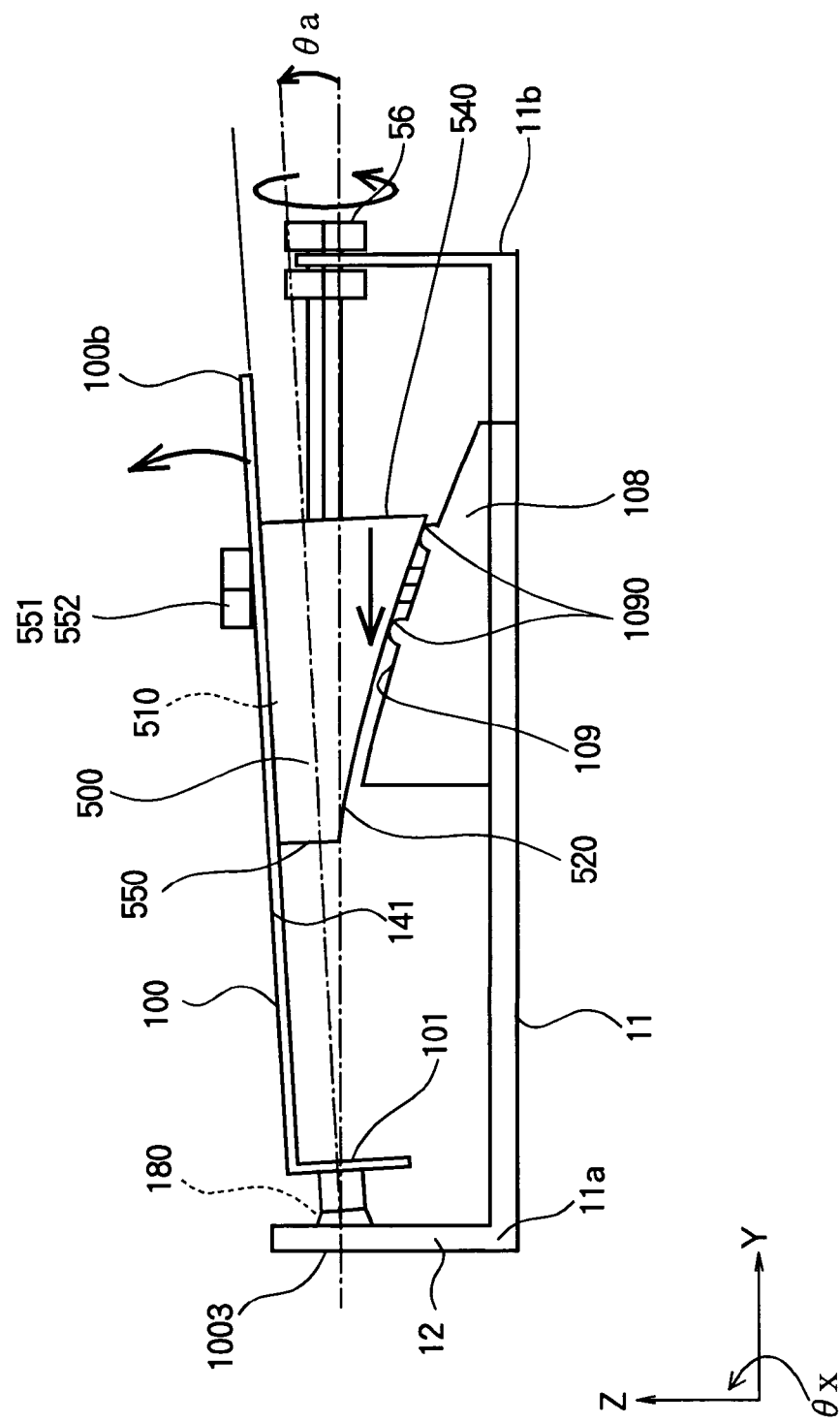
FIG. 13 is a side view showing the angle adjusting mechanism of FIG. 12 rotating the engine supporting plate at an angle θa in a positive (upward) vertical rotating direction θx to adjust the angle in the vertical direction in order to correct the vertical keystone distortion of the projected image.
Figure 14:
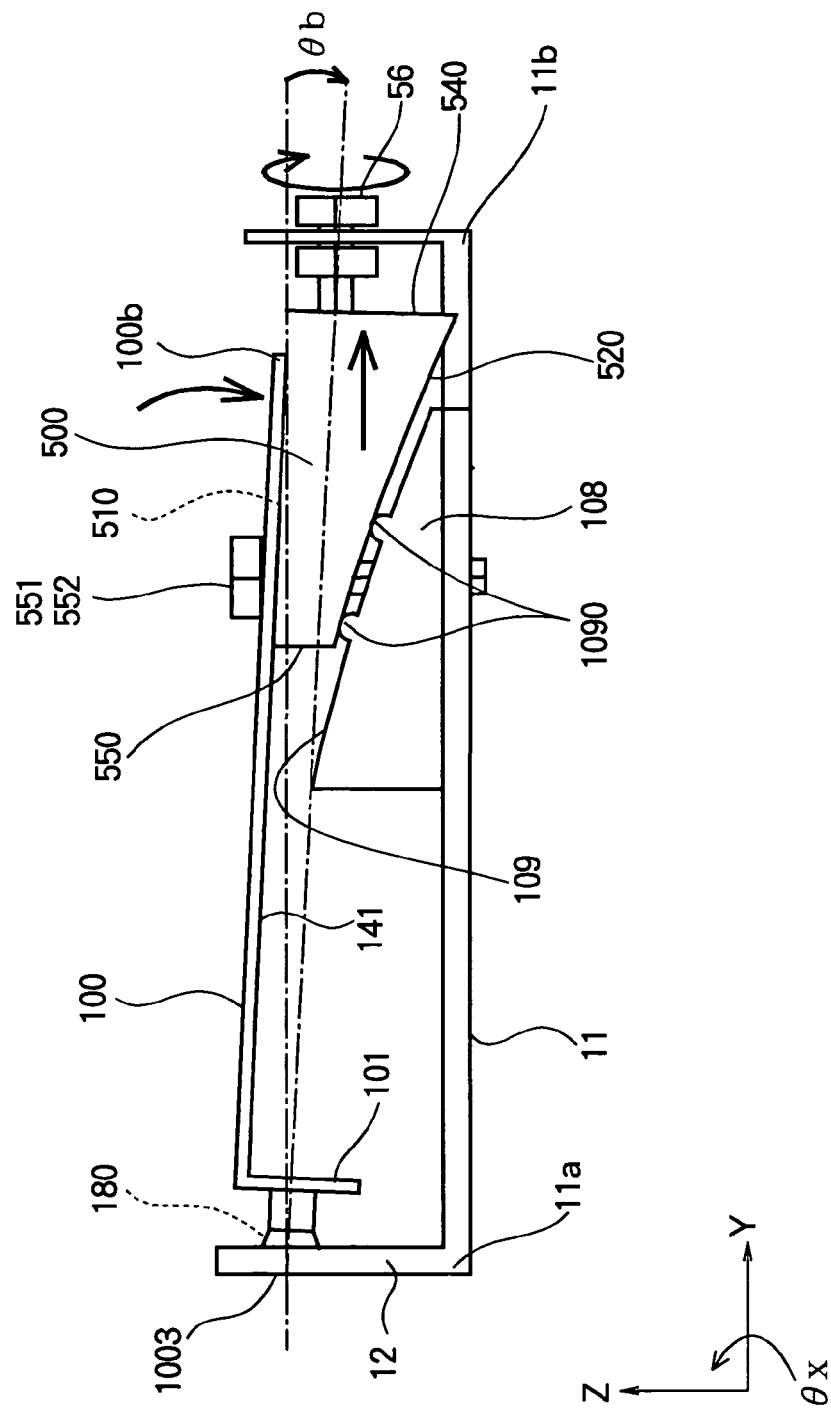
FIG. 14 is a side view showing the angle adjusting mechanism of FIG. 12 rotating the engine supporting plate at an angle θb in a negative (downward) vertical rotating direction θx to adjust the angle in the vertical direction in order to correct the vertical keystone distortion of the projected image.

FIGS. 12, 13 and 14 respectively correspond to FIGS. 5, 7 and 9 of the above described Embodiment 1. FIG. 12 is a side view showing an initial state before the adjustment of the angle of the engine supporting plate 100 using the angle adjusting mechanism shown. FIG. 13 is a side view showing the state where the angle adjusting mechanism rotates the engine supporting plate 100 in the vertical rotating direction (i.e., the direction θx) by an angle θa upward (i.e., in the positive direction) to correct the angle in the vertical direction, for correcting the vertical keystone distortion of the projected image. FIG. 14 is a side view showing the state where the angle adjusting mechanism rotates the engine supporting plate 100 in the vertical rotating direction (i.e., the direction θx) by an angle θb downward (i.e., in the negative direction) to correct the angle in the vertical direction, for correcting the vertical keystone distortion of the projected image.

As shown in FIGS. 12 through 14, the lower surface 520 of the adjusting member 500 has the arcuate shape in cross section as described above, but the lower surface 520 slidably contacts two contact protrusions 1090 formed on the slope surface 109 of the slope portion 108. The contact protrusions 1090 are linearly formed on two positions (on the slope surface 109) respectively at the front side and the rear side of the fixing bolts 551 and 552, so that the contact protrusions 1090 constantly contacts the adjusting member 500 during the movement of the adjusting member 500 in the front-to-rear direction. As long as at least two contact protrusions 1090 constantly contact the adjusting member 500 during the movement of the adjusting member 500 in the front-to-rear direction, the number of protrusions 1090 can be more than two.

The adjusting member 500 has the lower surface 520 having the arcuate shape in longitudinal cross section that contacts the contact protrusions 1090 of the slope portion 108. As was described in Embodiment 1, the curvature of the arcuate shape of the lower surface 520 is so determined that, when the engine supporting plate 100 is vertically rotated, the angle of the upper surface 510 (that does not contact the slope surface 109) of the adjusting member 500 follows the change in the angle between the lower surface 141 of the engine supporting plate 100 and the base portion 11.

Next, the angle adjusting operation using the angle adjusting mechanism of this embodiment will be described with reference to FIG. 12 through FIG. 14.

In order to rotate the optical engine (not shown) placed on the engine supporting plate 100 shown in FIG. 12 in the direction θx in the positive direction (upward) to thereby incline the optical engine, the front-to-rear position adjusting screw 56 is rotated counterclockwise (in the loosening direction) as shown in FIG. 13. The head of the front-to-rear position adjusting screw 56 is rotatable, but does not move in the front-to-rear direction due to the engagement with the U-shaped cutout groove of the base bending protrusion 1005. Therefore, the adjusting member 500 in which the screw nut 80 is buried moves in the negative Y direction in FIG. 13. With this, the adjusting member 500 moves upward (i.e., in the positive Z direction) contacting the two protrusions 1090 along the slope surface 109 of the slope member 108 while maintaining a stable posture.

The lower surface 520 of the adjusting member 500 has the arcuate shape in cross section. Therefore, when the adjusting member 500 moves frontward and upward contacting the two protrusions 1090 along the slope surface 109 while maintaining the stable posture, the angle of the flat upper surface 510 about the center shaft protrusion 180 (the center shaft receiving portion 1003) is changed, and the flat upper surface 510 pushes the engine supporting plate 100 upward. Accordingly, the engine supporting plate 100 is inclined at an angle θa about the center shaft protrusion 180 as shown in FIG. 13.

In this case, the arcuate shape (in cross section) of the lower surface 520 of the adjusting member 500 has the curvature such that the flat upper surface 510 of the adjusting member 500 is inclined at an angle corresponding to the inclination of the engine supporting plate 100, and therefore the lower surface 141 of the engine supporting plate 100 and the upper surface 510 of the adjusting member 500 are constantly kept in contact (surface contact) with each other.

In order to rotate the optical engine (not shown) in the direction θx in the negative direction (downward) to thereby incline the optical engine, the front-to-rear position adjusting screw 56 is rotated clockwise (in the fastening direction) as shown in FIG. 14. The head of the front-to-rear position adjusting screw 56 does not move in the front-to-rear direction, and the adjusting member 500 in which the screw nut 80 (relatively movable with respect to the head of the front-to-rear position adjusting screw 56) is buried moves in the positive Y direction in FIG. 14. With this, the adjusting member 500 moves downward in the negative Z direction contacting the two protrusions 1090 along the slope surface 109 of the slope member 108 while maintaining the stable posture.

The lower surface 520 of the adjusting member 500 has the arcuate shape in cross section, and therefore, when the adjusting member 500 moves rearward and downward contacting the protrusions 1090 along the slope surface 109 while maintaining the stable posture, the angle of the flat upper surface 510 about the center shaft protrusion 180 (the center shaft receiving portion 1003) is changed, and the engine supporting plate 100 follows the downward movement of the flat upper surface 510 of the adjusting member 500. Therefore, the engine supporting plate 100 is inclined at an angle θb about the center shaft protrusion 180 as shown in FIG. 14.

Also in this case, the arcuate shape (in cross section) of the lower surface 520 of the adjusting member 500 has the curvature such that the flat surface 510 of the adjusting member 500 is inclined at an angle corresponding to the inclination of the engine supporting plate 100, and therefore the lower surface 141 of the engine supporting plate 100 and the upper surface 510 of the adjusting member 500 are constantly kept in contact (surface contact) with each other.

As described above, according to the projection apparatus of Embodiment 2 of the present invention, the same advantage as Embodiment 1 can be obtained. That is, the structure can be simplified, the number of components can be reduced, and the number of connecting portions can be reduced. Therefore, it becomes possible to reduce the cost and weight of the projection apparatus. Moreover, the operability of assembling and adjusting the angle adjusting mechanism during the manufacturing process can be enhanced, and the working time can be shortened. Further, the accumulation of assembling errors can be reduced, and therefore the accuracy of adjustment of angle and rotating direction of the optical engine can be enhanced, and the rigidity of the optical engine can be enhanced. Furthermore, after the adjustment, the optical engine can be fixed using fixing bolts without causing the deformation of the engine supporting plate.

Embodiment 3

In the above described Embodiment 1, the lower surface 520 of the adjusting member 500 and the slope surface 109 of the slope portion 108 have the arcuate shapes having the same curvature in cross section. In this regard, it is also possible to vertically rotate the engine supporting plate 100 using one surface having an arcuate shape in cross section, and the other surface can be replaced by a plurality of protrusions that constantly contact the arcuate-shaped surface with line-contact or point-contact. In Embodiment 3, the description will be made to an example in which the slope surface 109 of the slope portion 108 has the arcuate shape in cross section as was described in Embodiment 1, and a plurality of protrusions are formed on the lower surface 520 of the adjusting member 500.

Figure 15:
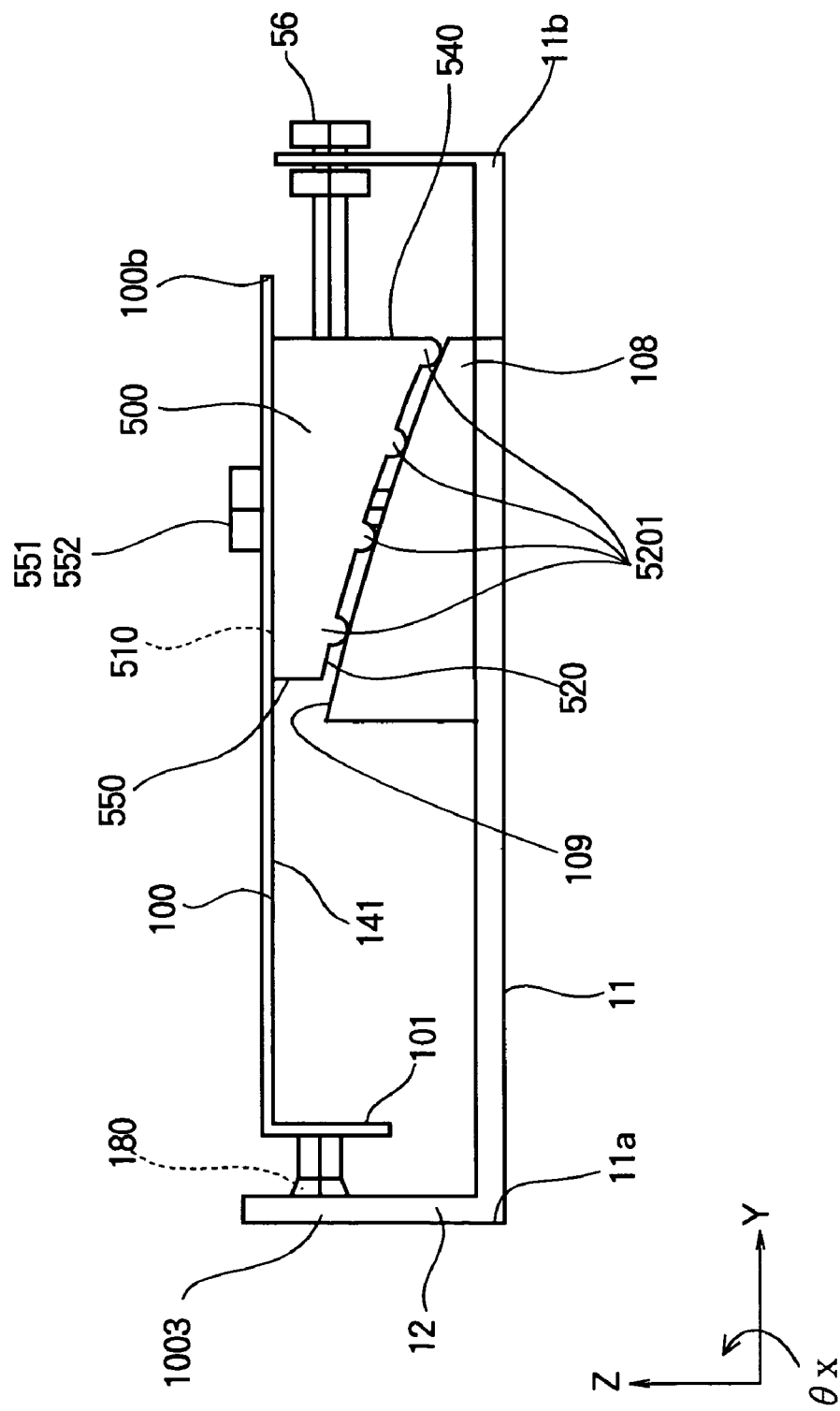
FIG. 15 is a side view of the angle adjusting mechanism according to Embodiment 3 of the present invention in an initial state before the adjustment of the angle of the engine supporting plate.
Figure 16:
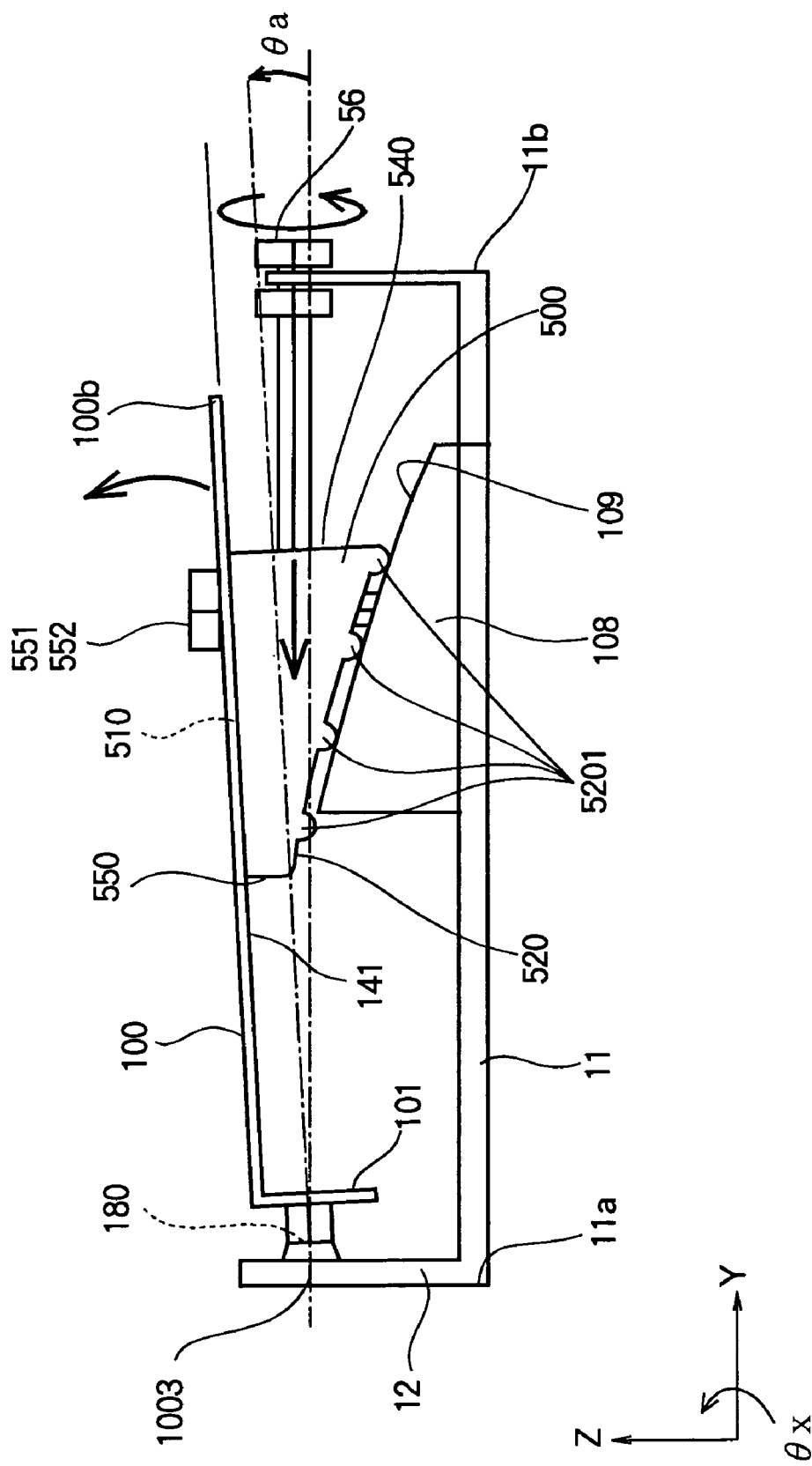
FIG. 16 is a side view showing the angle adjusting mechanism of FIG. 15 rotating the engine supporting plate at an angle θa in a positive (upward) vertical rotating direction θx to adjust the angle in the vertical direction in order to correct the vertical keystone distortion of the projected image.
Figure 17:
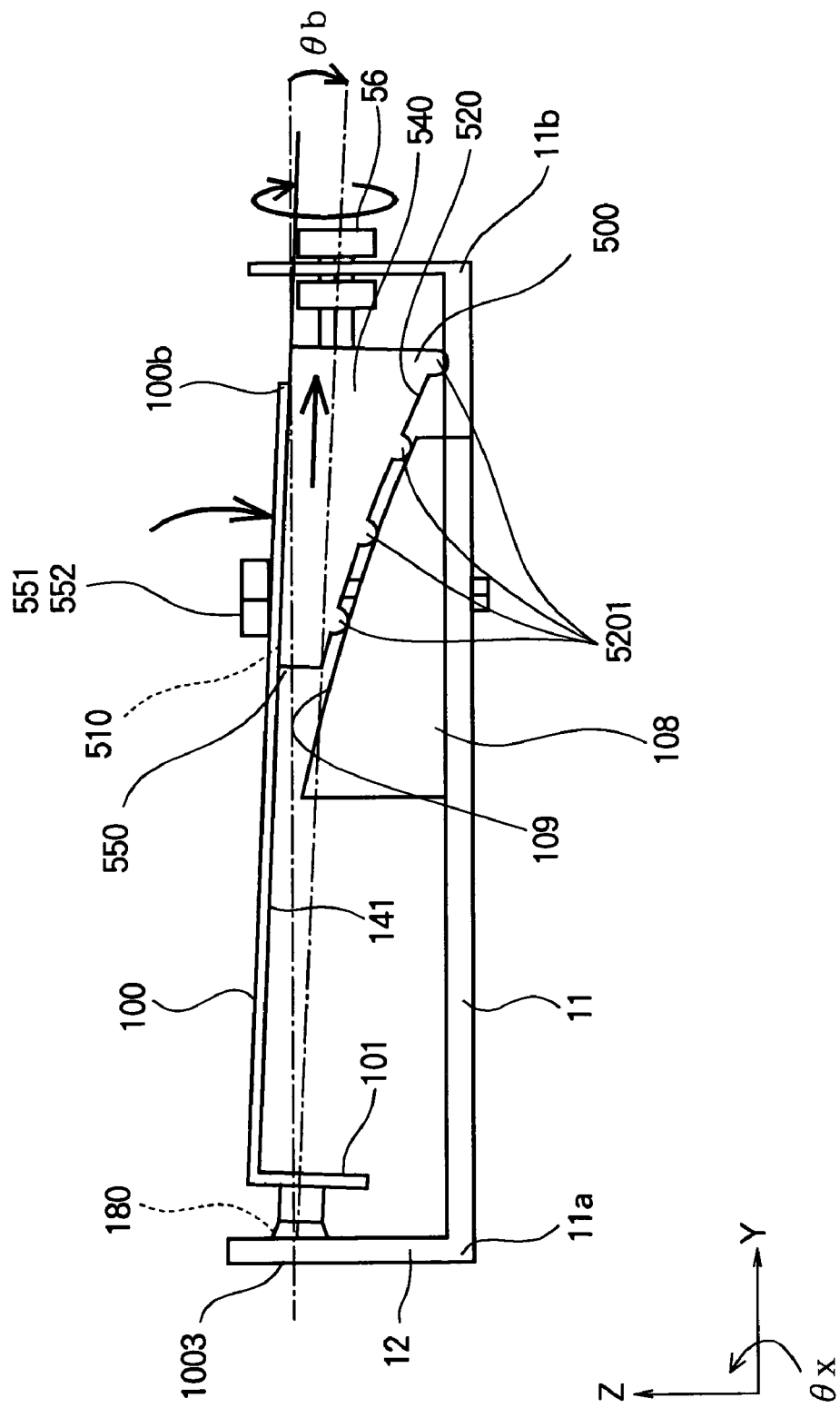
FIG. 17 is a side view showing the angle adjusting mechanism of FIG. 15 rotating the engine supporting plate at an angle θb in a negative (downward) vertical rotating direction θx to adjust the angle in the vertical direction in order to correct the vertical keystone distortion of the projected image.

FIGS. 15, 16 and 17 respectively correspond to FIGS. 5, 7 and 9 of the above described Embodiment 1. FIG. 15 is a side view showing an initial state before the adjustment of the angle of the engine supporting plate 100 using the angle adjusting mechanism. FIG. 16 is a side view showing the state where the angle adjusting mechanism rotates the engine supporting plate 100 in the vertical rotating direction (i.e., the direction θx) by an angle θa upward (i.e., in the positive direction) to correct the angle in the vertical direction, for correcting the vertical keystone distortion of the projected image. FIG. 17 is a side view showing the state where the angle adjusting mechanism rotates the engine supporting plate 100 in the vertical rotating direction (i.e., the direction θx) by an angle θb downward (i.e., in the negative direction) to correct the angle in the vertical direction, for correcting the vertical keystone distortion of the projected image.

As shown in FIGS. 15 through 17, the slope surface 109 of the slope portion 108 has the arcuate shape in cross section, but four contact protrusions 5201 are formed on the lower surface 520 of the adjusting member 500 in opposition to the slope surface 109 so that the contact protrusions 5201 slidably contact the slope surface 109. The contact protrusions 5201 are linearly formed in the left-to-right direction on the lower surface 520 so that the contact protrusions 5201 constantly contacts the slope surface 109 during the movement of the adjusting member 500 in the front-to-rear direction. As long as at least two contact protrusions 5201 constantly contact the slope surface 109 during the movement of the adjusting member 500 in the front-to-rear direction, the number of protrusions 5201 can be less than four, or more than four.

The slope surface 109 of the slope portion 108 has the arcuate shape in longitudinal cross section that contacts the contact protrusions 5201 of the lower surface 520 of the adjusting member 500. As was described in Embodiment 1, the curvature of the arcuate shape of the slope surface 109 is so determined that, when the engine supporting plate 100 is vertically rotated, the angle of the upper surface 510 (that does not contact the slope surface 109) of the adjusting member 500 follows the change in the angle between the lower surface 141 of the engine supporting plate 100 and the base portion 11.

Next, the angle adjusting operation using the angle adjusting mechanism of this embodiment will be described with reference to FIG. 15 through FIG. 17.

In order to rotate the optical engine (not shown) placed on the engine supporting plate 100 shown in FIG. 15 in the direction θx in the positive direction (upward) to thereby incline the optical engine, the front-to-rear position adjusting screw 56 is rotated counterclockwise (in the loosening direction) as shown in FIG. 16. The head of the front-to-rear position adjusting screw 56 is rotatable, but does not move in the front-to-rear direction due to the engagement with the U-shaped cutout groove of the base bending protrusion 1005. Therefore, the adjusting member 500 in which the screw nut 80 is buried moves in the negative Y direction in the FIG. 16. With this, the adjusting member 500 moves upward (i.e., in the positive Z direction) contacting the slope surface 109 at the four protrusions 5210 formed along the lower surface 520 while maintaining a stable posture.

The slope surface 109 of the slope portion 108 has the arcuate shape in cross section. Therefore, when the adjusting member 500 moves frontward and upward contacting the slope 109 at the protrusions 5201 along the lower surface 520 while maintaining the stable posture, the angle of the flat upper surface 510 about the center shaft protrusion 180 (the center shaft receiving portion 1003) is changed, and the flat upper surface 510 pushes the engine supporting plate 100 upward. Accordingly, the engine supporting plate 100 is inclined at an angle θa about the center shaft protrusion 180 as shown in FIG. 16.

In this case, the arcuate shape (in cross section) of the slope surface 109 of the slope portion 108 has the curvature such that the flat upper surface 510 of the adjusting member 500 is inclined at an angle corresponding to the inclination of the engine supporting plate 100, and therefore the lower surface 141 of the engine supporting plate 100 and the upper surface 510 of the adjusting member 500 are constantly kept in contact (surface contact) with each other.

In order to rotate the optical engine (not shown) in the direction θx in the negative direction (downward) to thereby incline the optical engine, the front-to-rear position adjusting screw 56 is rotated clockwise (in the fastening direction) as shown in FIG. 17. The head of the front-to-rear position adjusting screw 56 does not move in the front-to-rear direction, and the adjusting member 500 in which the screw nut 80 (relatively movable with respect to the head of the front-to-rear position adjusting screw 56) is buried moves in the positive Y direction in FIG. 17. With this, the adjusting member 500 moves downward in the negative Z direction contacting the slope surface 109 at four protrusions 5201 formed along the lower surface 520 while maintaining the stable posture.

The slope surface 109 of the slope portion 108 has the arcuate shape in cross section, and therefore, when the adjusting member 500 moves rearward and downward contacting the slope surface 109 at the four protrusions 5201 formed along the lower surface 520 while maintaining the stable posture, the angle of the flat upper surface 510 about the center shaft protrusion 180 (the center shaft receiving portion 1003) is changed, and the engine supporting plate 100 follows the downward movement of the flat upper surface 510 of the adjusting member 500. Therefore, the engine supporting plate 100 is inclined at an angle θb about the center shaft protrusion 180 as shown in FIG. 17.

Also in this case, the arcuate shape (in cross section) of the slope surface 109 of the slope portion 108 has the curvature such that the flat upper surface 510 of the adjusting member 500 is inclined at an angle corresponding to the inclination of the engine supporting plate 100, and therefore the lower surface 141 of the engine supporting plate 100 and the upper surface 510 of the adjusting member 500 are constantly kept in contact (surface contact) with each other.

As described above, according to the projection apparatus of Embodiment 3 of the present invention, the same advantage as Embodiment 1 can be obtained. That is, the structure can be simplified, the number of components can be reduced, and the number of connecting portions can be reduced. Therefore, it becomes possible to reduce the cost and weight of the projection apparatus. Moreover, the operability of assembling and adjusting the angle adjusting mechanism during the manufacturing process can be enhanced, and the working time can be shortened. Further, the accumulation of assembling errors can be reduced, and therefore the accuracy of adjustment of angle and rotating direction of the optical engine can be enhanced, and the rigidity of the optical engine can be enhanced. Furthermore, after the adjustment, the optical engine can be fixed using fixing bolts without causing the deformation of the engine supporting plate.

Embodiment 4

Figure 18:
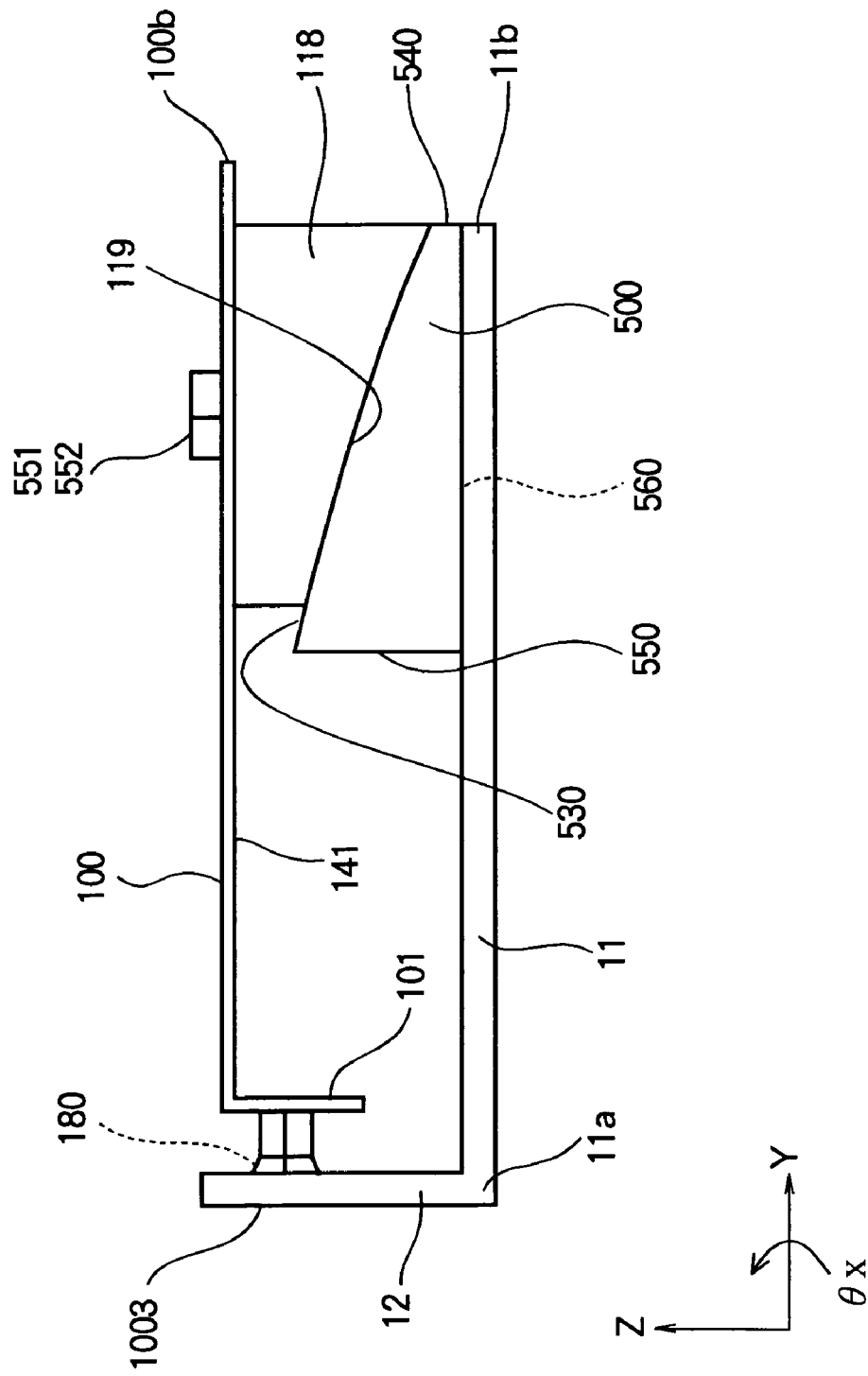
FIG. 18 is a side view of the angle adjusting mechanism according to Embodiment 4 of the present invention in an initial state before the adjustment of the angle of the engine supporting plate.

In the above described Embodiments 1, 2 and 3, the slope portion 108 (with the slope surface 109) is formed on the bottom side of the housing 1, and at least one of the lower surface 520 of the adjusting member 500 and the slope surface 109 has the arcuate shape in cross section having a predetermined curvature. However, as shown in FIG. 18, it is also possible to provide a slope portion 118 (with a slope surface 119) on the lower surface 141 of the engine supporting plate 100, and to provide the adjusting member 500 below the slope portion 118. In such a case, as was described in Embodiment 1, the slope surface 119 and the upper surface 530 of the adjusting member 500 can have predetermined arcuate shapes in cross section. Alternatively, as was described in Embodiment 2, the slope surface 119 can have a predetermined arcuate shape in cross section, and contact protrusions can be formed on the upper surface 530 of the adjusting member 500. Further alternatively, as was described in Embodiment 3, the upper surface 530 of the adjusting member 530 can have a predetermined arcuate shape in cross section, and contact protrusions can be formed on the slope surface 119 of the slope portion 118.

In Embodiment 4, the description will be made to an example in which the slope surface 119 of the slope portion 118 and the upper surface 530 of the adjusting member 500 have arcuate surfaces of the predetermined same curvature, as an example of the structure in which the slope portion 118 is formed on the lower surface 141 side of the engine supporting plate 100. It is also possible to form only one surface having the arcuate shape in cross section, and to form protrusions on the other surface as was described in Embodiments 2 and 3. In such a case, only the positions of the surfaces (and the numerals thereof) differ from Embodiments 2 and 3, and therefore the detailed explanation will be omitted.

Figure 19:
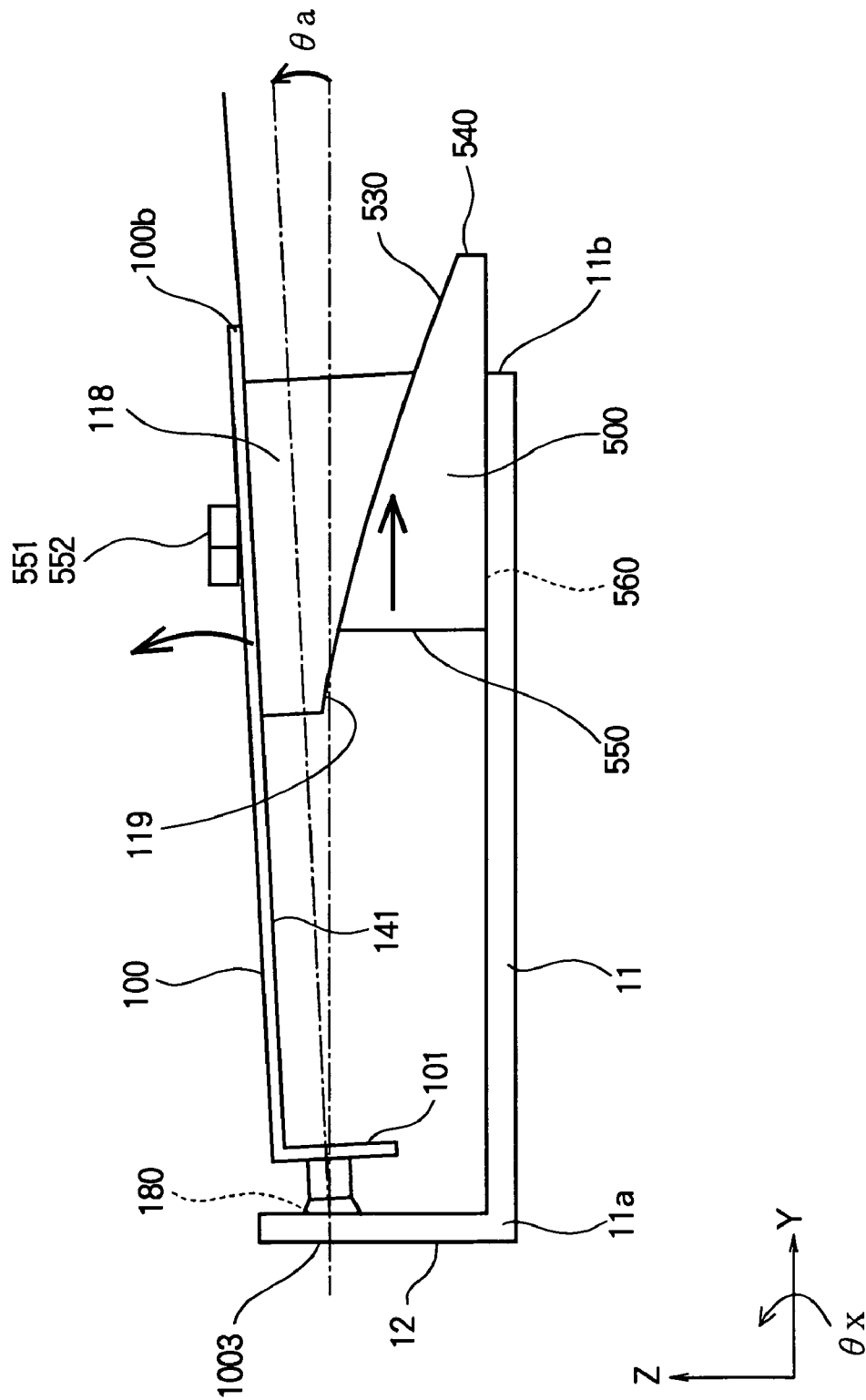
FIG. 19 is a side view showing the angle adjusting mechanism of FIG. 18 rotating the engine supporting plate at an angle θa in a positive (upward) vertical rotating direction θx to adjust the angle in the vertical direction in order to correct the vertical keystone distortion of the projected image.
Figure 20:
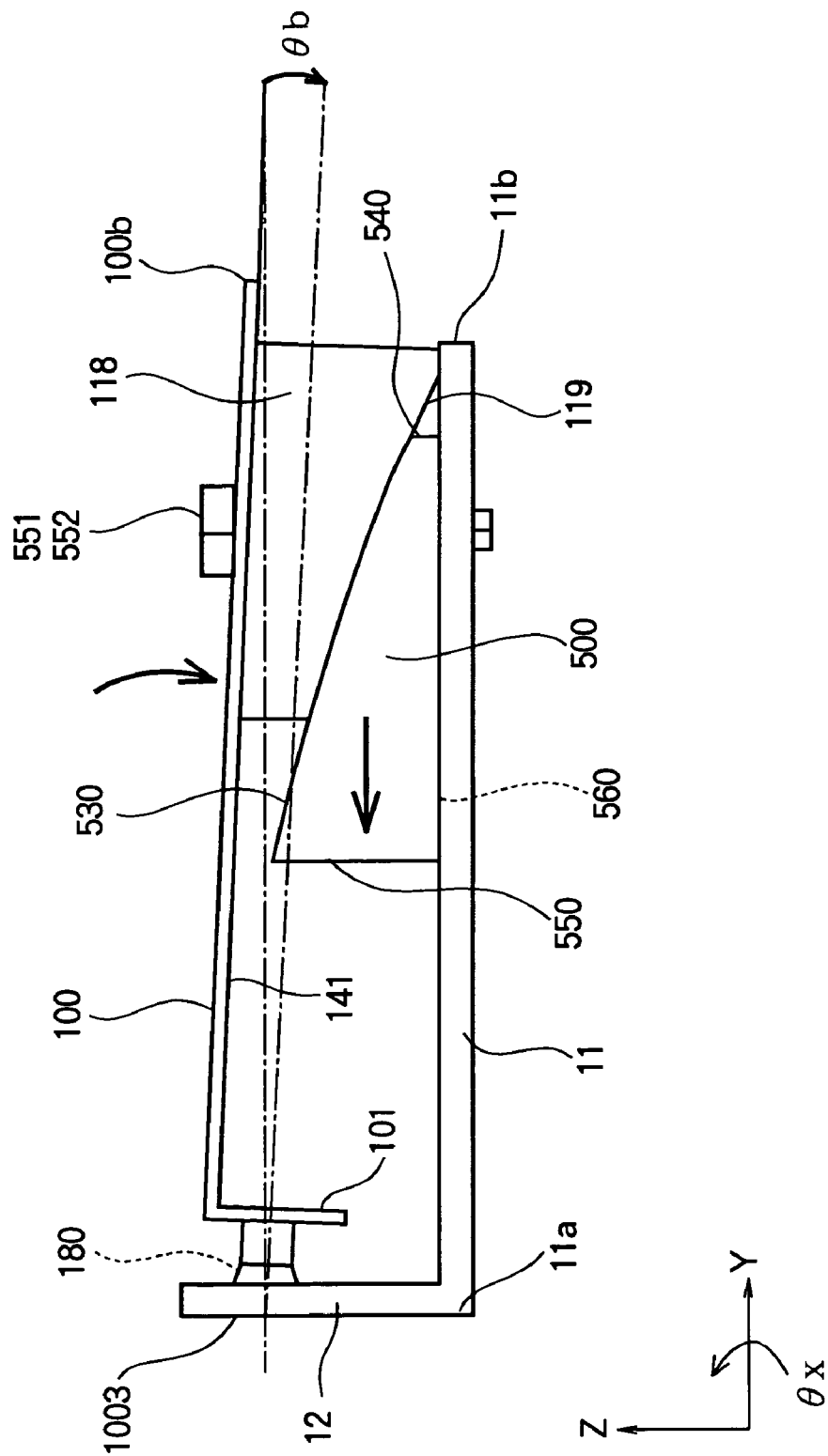
FIG. 20 is a side view showing the angle adjusting mechanism of FIG. 18 rotating the engine supporting plate at an angle θb in a negative (downward) vertical rotating direction θx to adjust the angle in the vertical direction in order to correct the vertical keystone distortion of the projected image.

FIGS. 18, 19 and 20 respectively correspond to FIGS. 5, 7 and 9 of the above described Embodiment 1. FIG. 18 is a side view showing an initial state before the adjustment of the angle of the engine supporting plate 100 using the angle adjusting mechanism. FIG. 19 is a side view showing the state where the angle adjusting mechanism rotates the engine supporting plate 100 in the vertical rotating direction (i.e., the direction θx) by an angle θa upward (i.e., in the positive direction) to correct the angle in the vertical direction, for correcting the vertical keystone distortion of the projected image. FIG. 20 is a side view showing the state where the angle adjusting mechanism rotates the engine supporting plate 100 in the vertical rotating direction (i.e., the direction θx) by an angle θb downward (i.e., in the negative direction) to correct the angle in the vertical direction, for correcting the vertical keystone distortion of the projected image.

As shown in FIGS. 18 through 20, the slope portion 118 is fixed to the lower surface 141 of the engine supporting plate 100. The adjusting member 500 is slidably moved in the front-to-rear direction by means of the not shown front-to-rear position adjusting unit. The front-to-rear position adjusting unit is basically the same as the front-to-rear position adjusting screw 56 described in the previous embodiments. However, in Embodiment 4, the position and the structure of the front-to-rear position adjusting unit are modified so that the front-to-rear position adjusting unit does not contact the slope portion 118 when the slope portion 118 moves downward as shown in FIG. 20.

The slope surface 119 and the upper surface 530 have arcuate shapes in cross section formed in the same manner as in Embodiment 1. The curvature of the arcuate shape of the slope surface 119 and the upper surface 530 are so determined that, when the engine supporting plate 100 is vertically rotated, the angle of the upper surface (opposite to the slope surface 119) of the slope portion 118 follows the change in the angle between the lower surface 141 of the engine supporting plate 100 and the base portion 11.

Next, the angle adjusting operation using the angle adjusting mechanism of this embodiment will be described with reference to FIG. 18 through FIG. 20.

As was described in the previous embodiments, by adjusting the not shown front-to-rear position adjusting unit (for example, a not shown front-to-rear position adjusting screw) the adjusting member 500 moves in the front-to-rear direction. As a result, the adjusting member 500 moves in the positive Z direction (i.e., upward) or in the negative Z direction (i.e., downward).

In the state shown in FIG. 18, the adjusting member 500 is located in the vicinity of the center in the adjustable range in the front-to-rear direction, and the angle of the engine supporting plate 100 is at the center of the adjustable range of the angle. By rotating the front-to-rear position adjusting unit from this initial state, the adjusting member 500 moves in the front-to-rear direction to thereby change the angle of the engine supporting plate 100, so that the optical engine 10 rotates in the vertical rotating direction (i.e., the direction θx). As a result, the angle of the optical engine 10 is adjusted in the vertical direction, so that the vertical keystone distortion can be corrected.

During this angle adjustment, the fixing bolts 551 and 552 are not yet fastened. The fixing bolts 551 and 552 are so loosened that the upper surface 530 of the adjusting member 500 can slide along the slope surface 119 of the slope member 118 and the lower surface 560 of the adjusting member 500 can slide along the base portion 11 both in the front-to-rear direction.

In order to rotate the optical engine (not shown) placed on the engine supporting plate 100 shown in FIG. 18 in the direction θx in the positive direction (upward) to thereby incline the optical engine, the front-to-rear position adjusting unit is operated as shown in FIG. 19. With this, the adjusting member 500 moves rearward (in the positive Y direction in FIG. 19), and causes the slope portion 118 to move upward (i.e., in the positive Z direction) since the slope surface 109 slides along the upper surface 530.

The upper surface 530 of the adjusting member 500 and the slope surface 119 have the arcuate shapes in cross section. Therefore, when the adjusting member 500 moves rearward and pushes the slope portion 118 upward, the angle of the flat upper surface of the slope portion 118 about the center shaft protrusion 180 (the center shaft receiving portion 1003) is changed, and the flat upper surface of the slope portion 118 (fixed to the engine supporting plate 100) pushes the engine supporting plate 100 upward. Accordingly, the engine supporting plate 100 is inclined at an angle θa about the center shaft protrusion 180 as shown in FIG. 19.

In this case, the arcuate shapes (in cross section) of the upper surface 530 of the adjusting member 500 and the slope surface 119 have the same curvature so that the flat upper surface of the slope portion 118 is inclined at an angle corresponding to the inclination of the engine supporting plate 100, and therefore the lower surface 560 of the adjusting member 500 and the upper surface of the base portion 11 are constantly kept in contact (surface contact) with each other.

In order to rotate the optical engine (not shown) in the direction θx in the negative direction (downward) to thereby incline the optical engine, the front-to-rear position adjusting unit is operated as shown in FIG. 20. With this, the adjusting member 500 moves frontward (in the negative Y direction in FIG. 20), and causes the slope portion 118 to move downward (i.e., in the negative Z direction) since the slope surface 119 slides along the upper surface 530.

The upper surface 530 of the adjusting member 500 and the slope surface 119 have the arcuate shapes in cross section. Therefore, when the adjusting member 500 moves frontward and causes the slope portion 118 to move downward, the angle of the flat upper surface of the slope portion 118 about the center shaft protrusion 180 (the center shaft receiving portion 1003) is changed, and the flat upper surface of the slope portion 118 (fixed to the engine supporting plate 100) is accompanied by the engine supporting plate 100 that moves downward. Accordingly, the engine supporting plate 100 is inclined at an angle θb about the center shaft protrusion 180 as shown in FIG. 20.

Also in this case, the arcuate shapes (in cross section) of the upper surface 530 of the adjusting member 500 and the slope surface 119 have the same curvature so that the flat upper surface of the slope portion 118 is inclined at an angle corresponding to the inclination of the engine supporting plate 100, and therefore the lower surface 560 of the adjusting member 500 and the upper surface of the base portion 11 are constantly kept in contact (surface contact) with each other.

As described above, according to the projection apparatus of Embodiment 3 of the present invention, the same advantage as Embodiment 1 can be obtained. That is, the structure can be simplified, the number of components can be reduced, and the number of connecting portions can be reduced. Therefore, it becomes possible to reduce the cost and weight of the projection apparatus. Moreover, the operability of assembling and adjusting the angle adjusting mechanism during the manufacturing process can be enhanced, and the working time can be shortened. Further, the accumulation of assembling errors can be reduced, and the accuracy of angle and rotating direction of the optical engine can be enhanced, and the rigidity of the optical engine can be enhanced. Furthermore, after the adjustment, the optical engine can be fixed using fixing bolts without causing the deformation of the engine supporting plate.

Embodiment 5

In the above described Embodiments 1, 2, 3 and 4, the engine supporting plate 100 is continuously rotated in the vertical direction according to the front-to-rear position adjusting operation of the adjusting member 500. However, as shown in FIG. 21, it is also possible to form convexes and concaves on the slope surface 109 of the slope portion 108 in the form of a sawtooth continuously formed along a predetermined arcuate shape 3000, and to form convexes and concaves on the lower surface 520 (facing the slope surface 109) of the adjusting member 500 in the form of a sawtooth having an inverted shape of that of the slope surface 109 so that the convexes and concaves of the lower surface 520 of the adjusting member 500 engage the convexes and concaves of the slope surface 109 of the slope member 108.

Figure 21:
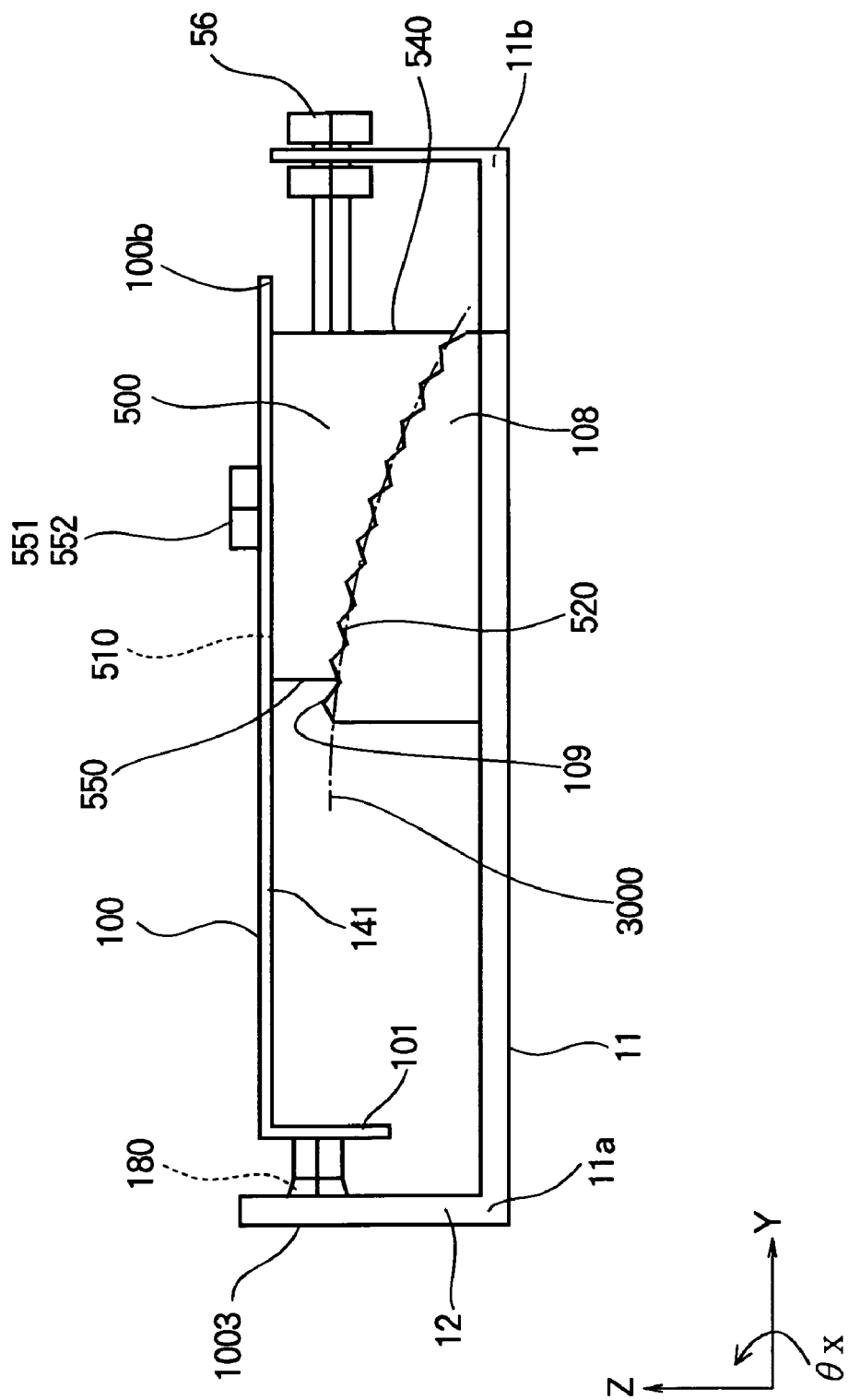
FIG. 21 is a side view of the angle adjusting mechanism according to Embodiment 5 of the present invention in an initial state before the adjustment of the angle of the engine supporting plate.
Figure 22:
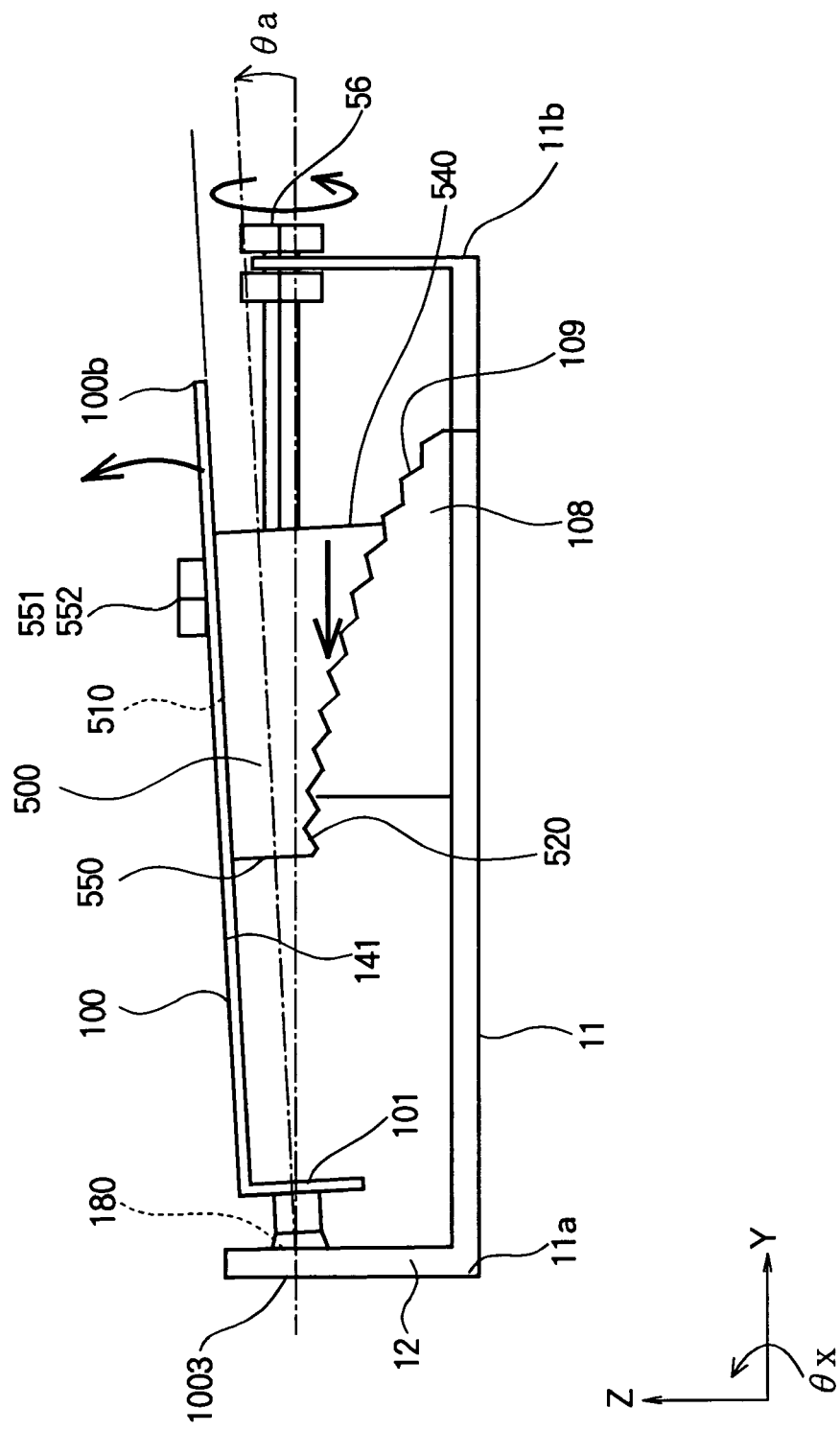
FIG. 22 is a side view showing the angle adjusting mechanism of FIG. 21 rotating the engine supporting plate at an angle θa in a positive (upward) vertical rotating direction θx to adjust the angle in the vertical direction in order to correct the vertical keystone distortion of the projected image.
Figure 23:
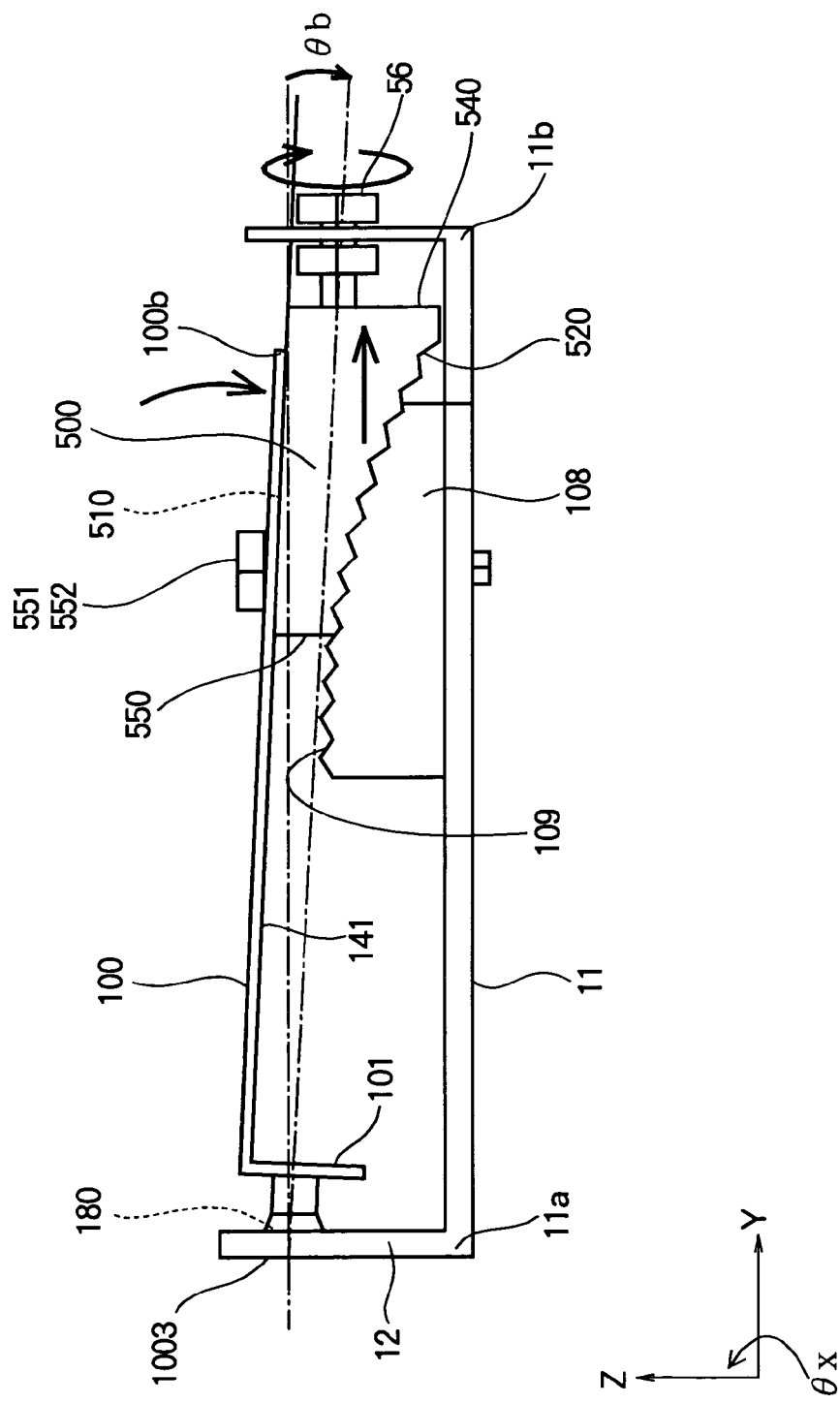
FIG. 23 is a side view showing the angle adjusting mechanism of FIG. 21 rotating the engine supporting plate at an angle θb in a negative (downward) vertical rotating direction θx to adjust the angle in the vertical direction in order to correct the vertical keystone distortion of the projected image.

FIGS. 21, 22 and 23 respectively correspond to FIGS. 5, 7 and 9 of the above described Embodiment 1. FIG. 21 is a side view of an angle adjusting mechanism in an initial state before the adjustment of the angle of the engine supporting plate 100. FIG. 22 is a side view showing the state where the angle adjusting mechanism rotates the engine supporting plate 100 in the vertical rotating direction (i.e., the direction θx) by an angle θa upward (i.e., in the positive direction) to correct the angle in the vertical direction, for correcting the vertical keystone distortion of the projected image. FIG. 23 is a side view showing the state where the angle adjusting mechanism rotates the engine supporting plate 100 in the vertical rotating direction (i.e., the direction θx) by an angle θb downward (i.e., in the negative direction) to correct the angle in the vertical direction, for correcting the vertical keystone distortion of the projected image.

As shown in FIG. 21, the arcuate shape 3000 is has the same curvature as the slope surface 109 (i.e., the curvature of the lower surface 520 of the adjusting member 500) described in Embodiment 1. By operating the front-to-rear adjusting screw 56, the adjusting member 500 moves in the front-to-rear direction. With this movement, the convexes of the sawtooth on the lower surface 520 of the adjusting member 500 moves over the convexes of the sawtooth on the slope surface 109, and the adjusting member 500 moves along the predetermined arcuate shape 3000. The adjusting member 500 is in a stable condition, when the convexes on the surface 520 of the adjusting member 500 engages the concaves on the slope surface 109 of the slope portion 108. Therefore, the adjustment can be performed in a stepwise fashion according to the pitch of the sawtooth.

In the projection apparatus of Embodiment 5, even when the fixing bolts 551 and 552 are loosened due to vibration or the like, the unintentional movement of the adjusting member 500 can be prevented because of the engagement between the convexes on the surface 520 of the adjusting member 500 and the concaves on the slope surface 109 of the slope portion 108. As a result, the optical engine can be stably supported for a long time.

Next, the angle adjusting operation using the angle adjusting mechanism of this embodiment will be described with reference to FIG. 21 through FIG. 23.

In order to rotate the optical engine (not shown) placed on the engine supporting plate 100 shown in FIG. 21 in the direction θx in the positive direction (upward) to thereby incline the optical engine, the front-to-rear position adjusting screw 56 is rotated counterclockwise (in the loosening direction) as shown in FIG. 22. The head of the front-to-rear position adjusting screw 56 is rotatable, but does not move in the front-to-rear direction due to the engagement with the U-shaped cutout groove of the base bending protrusion 1005. Therefore, the adjusting member 500 in which the screw nut 80 is buried moves in the negative Y direction in FIG. 22. With this, the adjusting member 500 moves upward (i.e., in the positive Z direction) causing the convexes and concaves thereon to contact the convexes and concaves on the slope surface 109 of the slope portion 108.

The lower surface 520 of the adjusting member 500 is formed along the arcuate shape 300. Therefore, when the adjusting member 500 moves frontward and upward contacting the convexes and concaves of the slope surface 109 while maintaining the stable posture, the angle of the flat upper surface 510 about the center shaft protrusion 180 (the center shaft receiving portion 1003) is changed, and the flat upper surface 510 pushes the engine supporting plate 100 upward. Accordingly, the engine supporting plate 100 is inclined at an angle θa about the center shaft protrusion 180 as shown in FIG. 22.

In this case, the arcuate shape 3000 has the curvature such that the flat surface 510 of the adjusting member 500 is inclined at an angle corresponding to the inclination of the engine supporting plate 100, and therefore the lower surface 141 of the engine supporting plate 100 and the upper surface 510 of the adjusting member 500 are constantly kept in contact (surface contact) with each other.

In order to rotate the optical engine (not shown) in the direction θx in the negative direction (downward) to thereby incline the optical engine, the front-to-rear position adjusting screw 56 is rotated clockwise (in the fastening direction) as shown in FIG. 23. The head of the front-to-rear position adjusting screw 56 does not move in the front-to-rear direction, and the adjusting member 500 in which the screw nut 80 (relatively movable with respect to the head of the front-to-rear position adjusting screw 56) is buried moves in the positive Y direction. With this, the adjusting member 500 moves downward in the negative Z direction causing the convexes and concaves thereon to contact the convexes and concaves on the slope surface 109 of the slope portion 108.

The lower surface 520 of the adjusting member 500 is formed along the arcuate shape 3000. Therefore, when the adjusting member 500 moves rearward and downward contacting the convexes and concaves of the slope surface 109 while maintaining the stable posture, the angle of the flat upper surface 510 about the center shaft protrusion 180 (the center shaft receiving portion 1003) is changed, and the engine supporting plate 100 follows the downward movement of the flat upper surface 510 of the adjusting member 500. Therefore, the engine supporting plate 100 is inclined at an angle θb about the center shaft protrusion 180 as shown in FIG. 23.

Also in this case, the arcuate shape 3000 has the curvature such that the flat upper surface 510 of the adjusting member 500 is inclined at an angle corresponding to the inclination of the engine supporting plate 100, and therefore the lower surface 141 of the engine supporting plate 100 and the upper surface 510 of the adjusting member 500 are constantly kept in contact (surface contact) with each other.

As described above, according to the projection apparatus of Embodiment 5, there is an advantage that the optical engine can be stably supported for a long time, in addition to advantages of Embodiments 1 through 4.

In this embodiment, the description has been made to the example in which the sliding surfaces (i.e., the slope surface 109 and the lower surface 520 of the adjusting member 500) have convexes and concaves of the sawtooth. However, it is also possible to provide convexes and concaves on the respective sliding surfaces in the previous Embodiments 2, 3 and 4, so as to perform the adjustment in a stepwise fashion.

The present invention is applicable to, for example, a large-screen projection television apparatus of rear projection type for household use or business use.

While the preferred embodiments of the present invention have been illustrated in detail, it should be apparent that modifications and improvements may be made to the invention without departing from the spirit and scope of the invention as described in the following claims.

What is claimed is:

1. A projection apparatus comprising:
a housing;
a transmission-type screen provided on a front side of said housing;
an optical engine provided in said housing, said optical engine projecting an image on said transmission-type screen from a rear side of said transmission-type screen;
an engine supporting plate on which said optical engine is placed, said engine supporting plate being provided in said housing so that an angle of said engine supporting plate is adjusted to thereby adjust a projecting direction of said optical engine;
a base portion provided on an inner bottom surface of said housing;
an adjusting member having a substantially wedge-shape with nonparallel upper and lower surfaces, said adjusting member being inserted into between said base portion and a lower surface of said engine supporting plate, so that front or rear end of said engine supporting plate is vertically rotatable;

a front-to-rear position adjusting unit capable of pushing said adjusting member frontward and pulling said adjusting member rearward;

a slope portion having a slope surface that gradually increases or decreases an angle of a surface of said adjusting member that contacts said engine supporting plate in accordance with a movement of said adjusting member in front-to-rear direction, and a fixing unit that fixes said engine supporting plate to an adjusted position, wherein said engine supporting plate has a convex-shaped center shaft protrusion at an end thereof opposite to a vertically rotated end, and wherein said base portion has a center shaft receiving portion in the form of a concave or through-hole capable of receiving said center shaft protrusion.

2. A projection apparatus comprising:

a housing;

a transmission-type screen provided on a front side of said housing;

an optical engine provided in said housing, said optical engine projecting an image on said transmission-type screen from a rear side of said transmission-type screen;

an engine supporting plate on which said optical engine is placed, said engine supporting plate being provided in said housing so that an angle of said engine supporting plate is adjusted to thereby adjust a projecting direction of said optical engine;

a base portion provided on an inner bottom surface of said housing;

an adjusting member having a substantially wedge-shape with nonparallel upper and lower surfaces, said adjusting member being inserted into between said base portion and a lower surface of said engine supporting plate, so that front or rear end of said engine supporting plate is vertically rotatable;

a front-to-rear position adjusting unit capable of pushing said adjusting member frontward and pulling said adjusting member rearward;

a slope portion having a slope surface that gradually increases or decreases an angle of a surface of said adjusting member that contacts said engine supporting plate in accordance with a movement of said adjusting member in front-to-rear direction, and a fixing unit that fixes said engine supporting plate to an adjusted position, wherein said base portion has a convex-shaped center shaft protrusion at a position facing an end of said engine supporting plate opposite to a vertically rotated end, and wherein said engine supporting plate has a center shaft receiving portion in the form of a concave or through-hole capable of receiving said center shaft protrusion.

3. The projection apparatus according to claim 1, wherein said center shaft protrusion has a shape such that said center shaft protrusion functions as a rotational axis in vertical and horizontal directions, and has a dimension such that said center shaft protrusion can be inserted into said center shaft receiving portion, and wherein said center shaft receiving portion has shape and dimension such that said center shaft receiving portion is able to receive said center shaft protrusion.

4. The projection apparatus according to claim 3, wherein said center shaft protrusion is provided on a front end of said engine supporting plate, and wherein said center shaft receiving portion is provided on said base portion.

5. The projection apparatus comprising:

an optical engine that projects an image;

an optical engine placing unit on which said optical engine is placed;

a supporting unit supporting said optical engine placing unit so that said optical engine placing unit is rotatable about a predetermined axis, wherein said supporting unit has a convex-shaped center shaft protrusion at an end thereof opposite to a vertically rotated end;

a center shaft receiving portion in the form of a concave or through-hole capable of receiving said center shaft protrusion; and an adjusting unit rotating said optical engine placing unit about said predetermined axis, to thereby adjust a projecting direction of said optical engine, wherein said adjusting unit comprises:

an adjusting member having an arcuate surface having a center at a predetermined point, and a guide portion that guides said adjusting member along said arcuate surface.

6. The projection apparatus comprising:

an optical engine that projects an image;

an optical engine placing unit on which said optical engine is placed;

a supporting unit supporting said optical engine placing unit so that said optical engine placing unit is rotatable about a predetermined axis;

a convex-shaped center shaft protrusion at a position facing an end of said supporting unit opposite to a vertically rotated end, wherein said supporting unit has a center shaft receiving portion in the form of a concave or through-hole capable of receiving said center shaft protrusion; and an adjusting unit rotating said optical engine placing unit about said predetermined axis, to thereby adjust a projecting direction of said optical engine, wherein said adjusting unit comprises:

an adjusting member having an arcuate surface having a center at a predetermined point, and a guide portion that guides said adjusting member along said arcuate surface.

\* \* \* \* \*